W. L. GUMPRECHT.
COMBINED TYPEWRITING AND COMPUTING MACHINE.
APPLICATION FILED FEB. 1, 1916.
1,338,012. Patented Apr. 27, 1920.
9 SHEETS—SHEET 2.
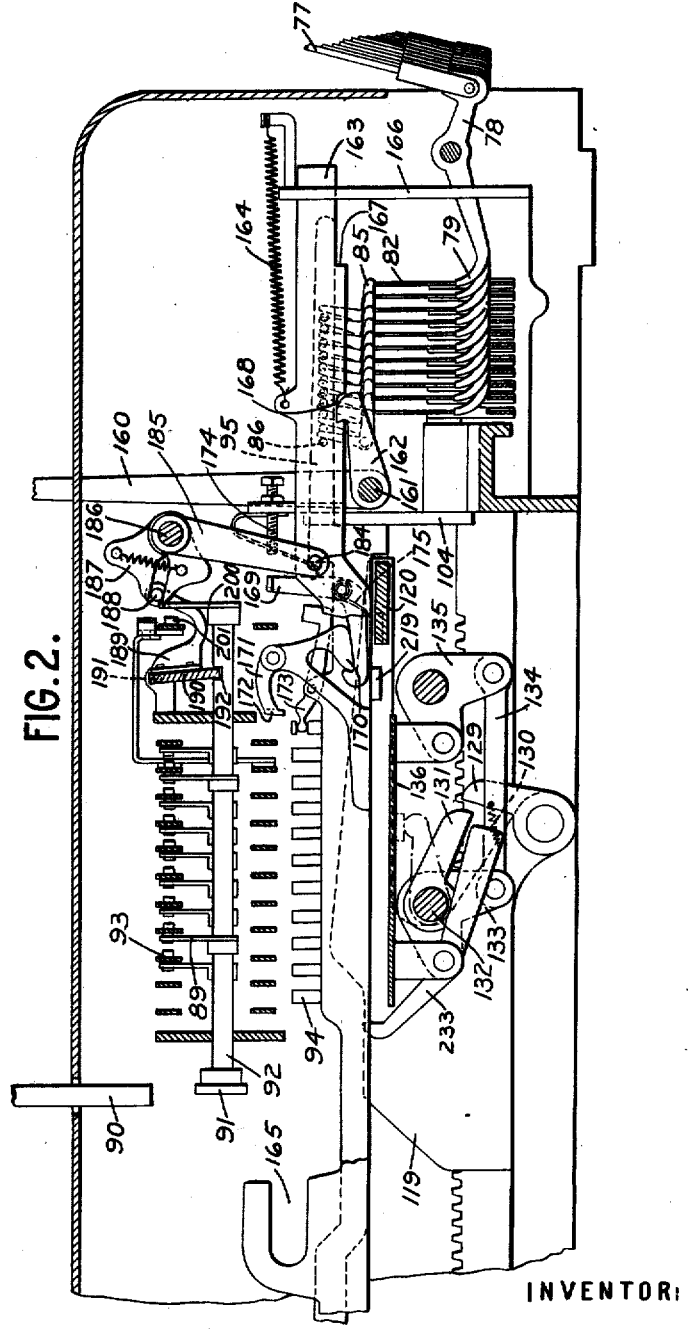
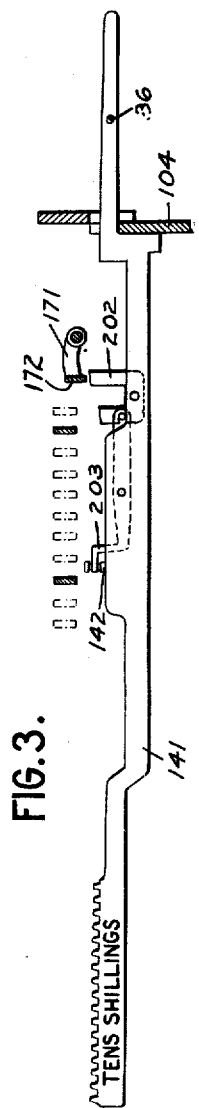
WITNESSES:
F. E. Alexander
Arthur G. Johnson
INVENTOR:
William L. Gumprecht
BY B. C. Stickney
ATTORNEY.

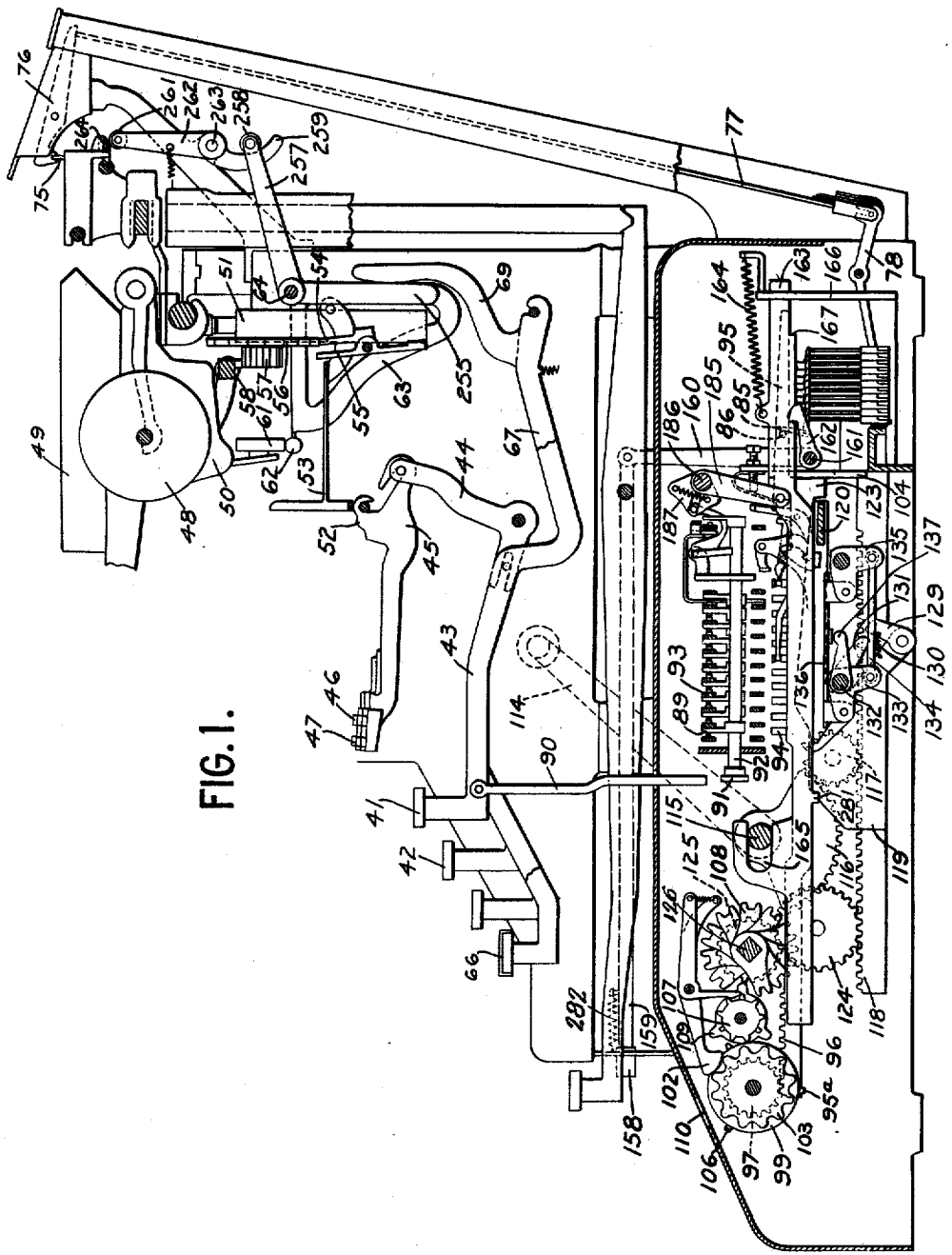

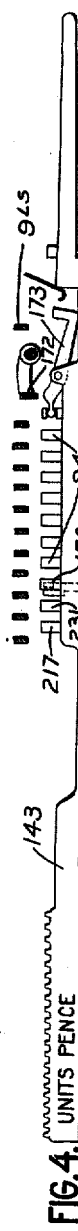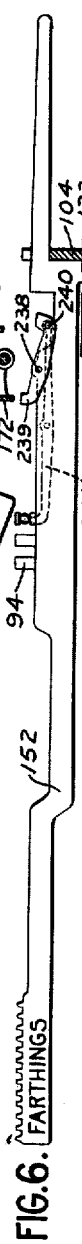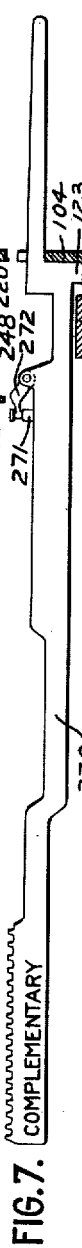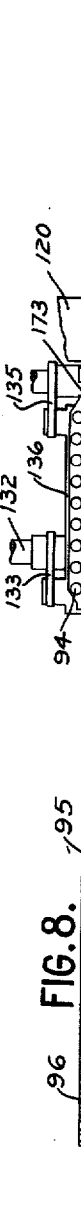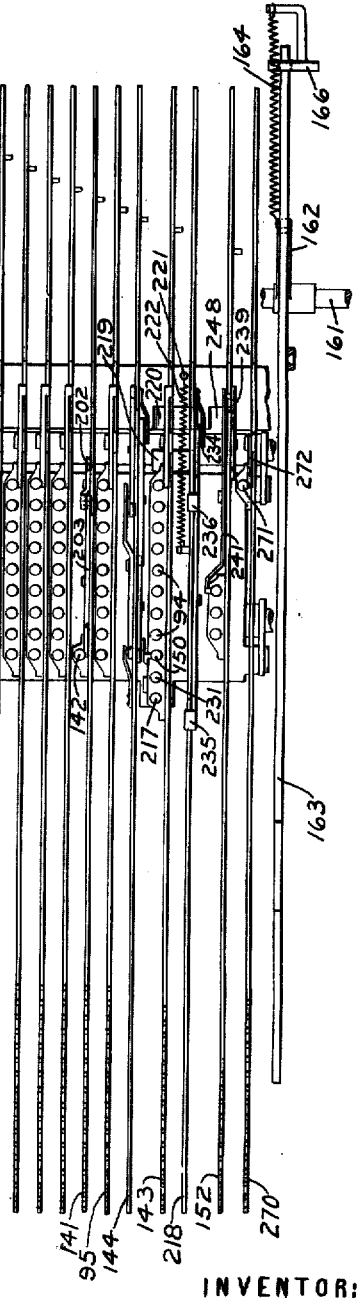

W. L. GUMPRECHT.
COMBINED TYPEWRITING AND COMPUTING MACHINE.
APPLICATION FILED FEB. 1, 1916.
1,338,012.
Patented Apr. 27, 1920.
9 SHEETS—SHEET 4.
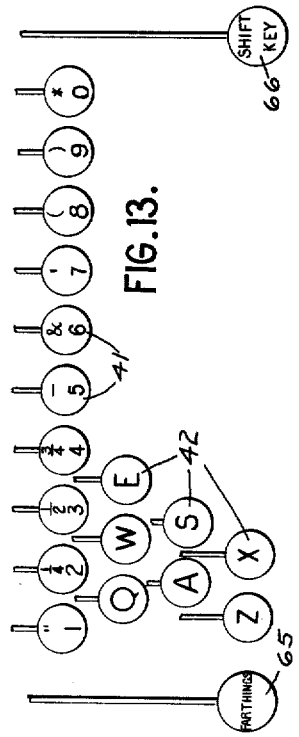
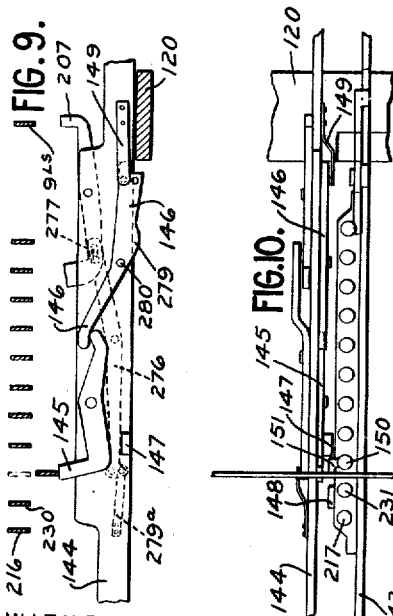
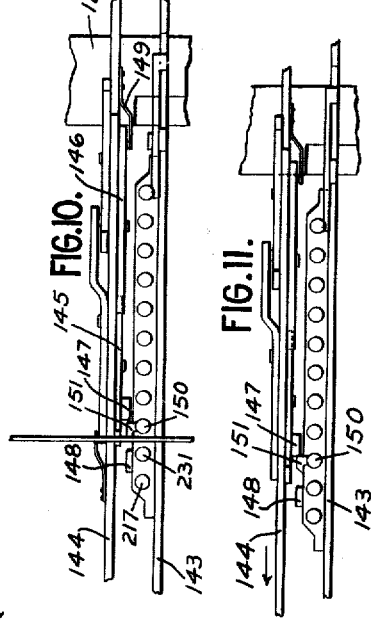
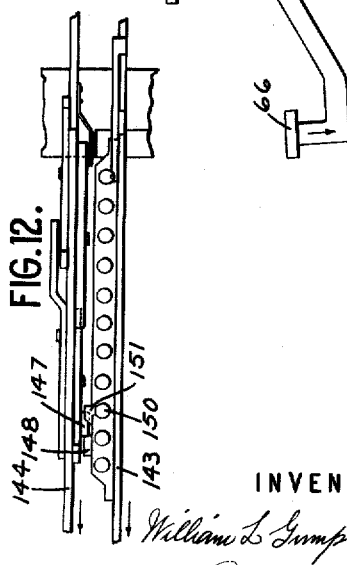
WITNESSES:
F. E. Alexander
Arthur A. Johnson
INVENTOR:
William L. Gumprecht
BY B. C. Stickney
ATTORNEY.

W. L. GUMPRECHT.
COMBINED TYPEWRITING AND COMPUTING MACHINE.
APPLICATION FILED FEB. 1, 1916.
1,338,012.
Patented Apr. 27, 1920.
9 SHEETS—SHEET 5.
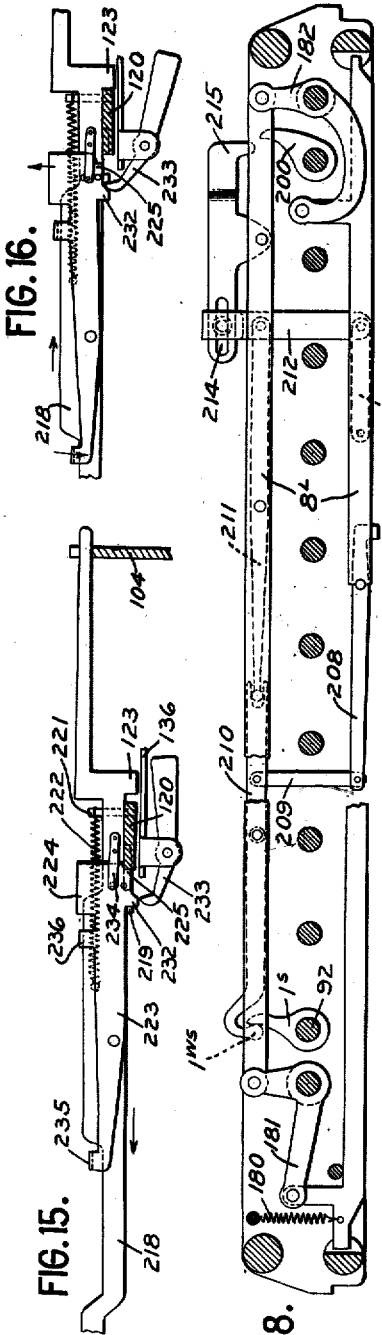
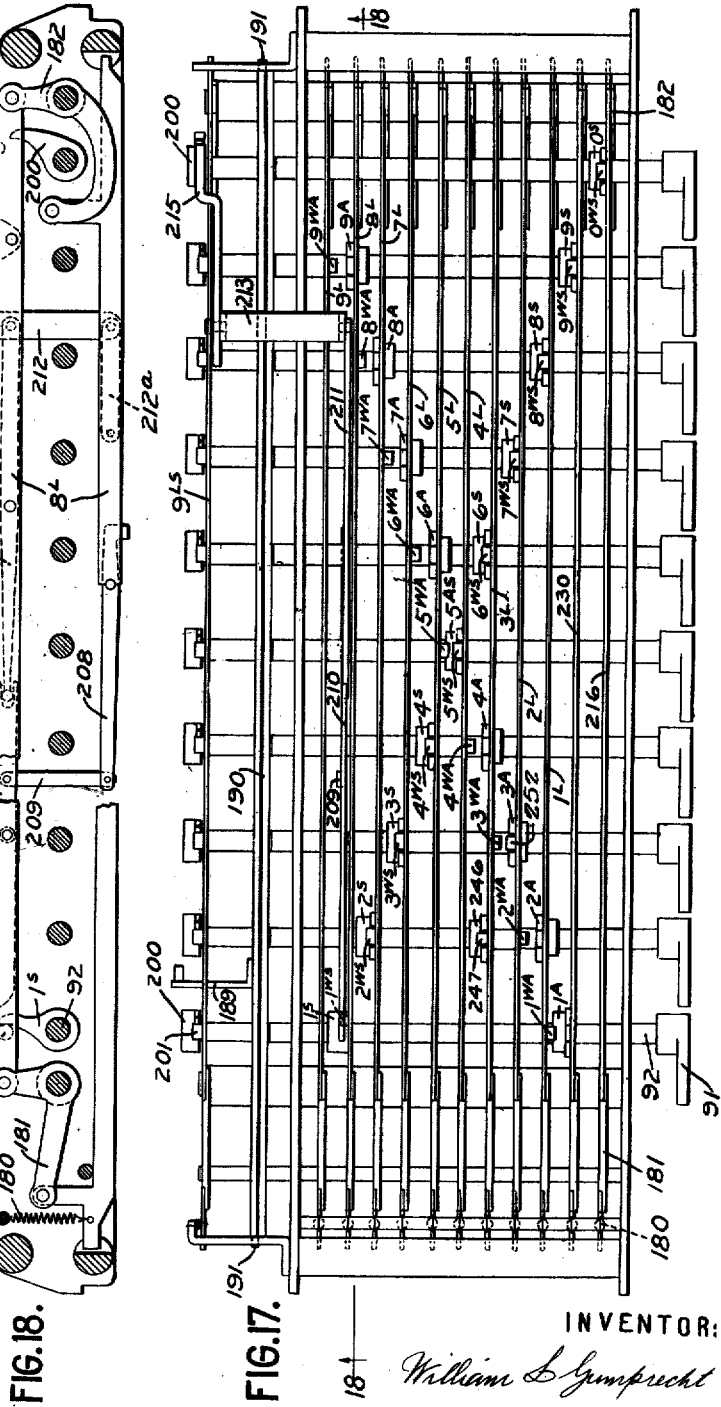
WITNESSES:
F. E. Alexander
Arthur A. Johnson
INVENTOR:
William L. Gumprecht
BY
B. C. Stickney
ATTORNEY.

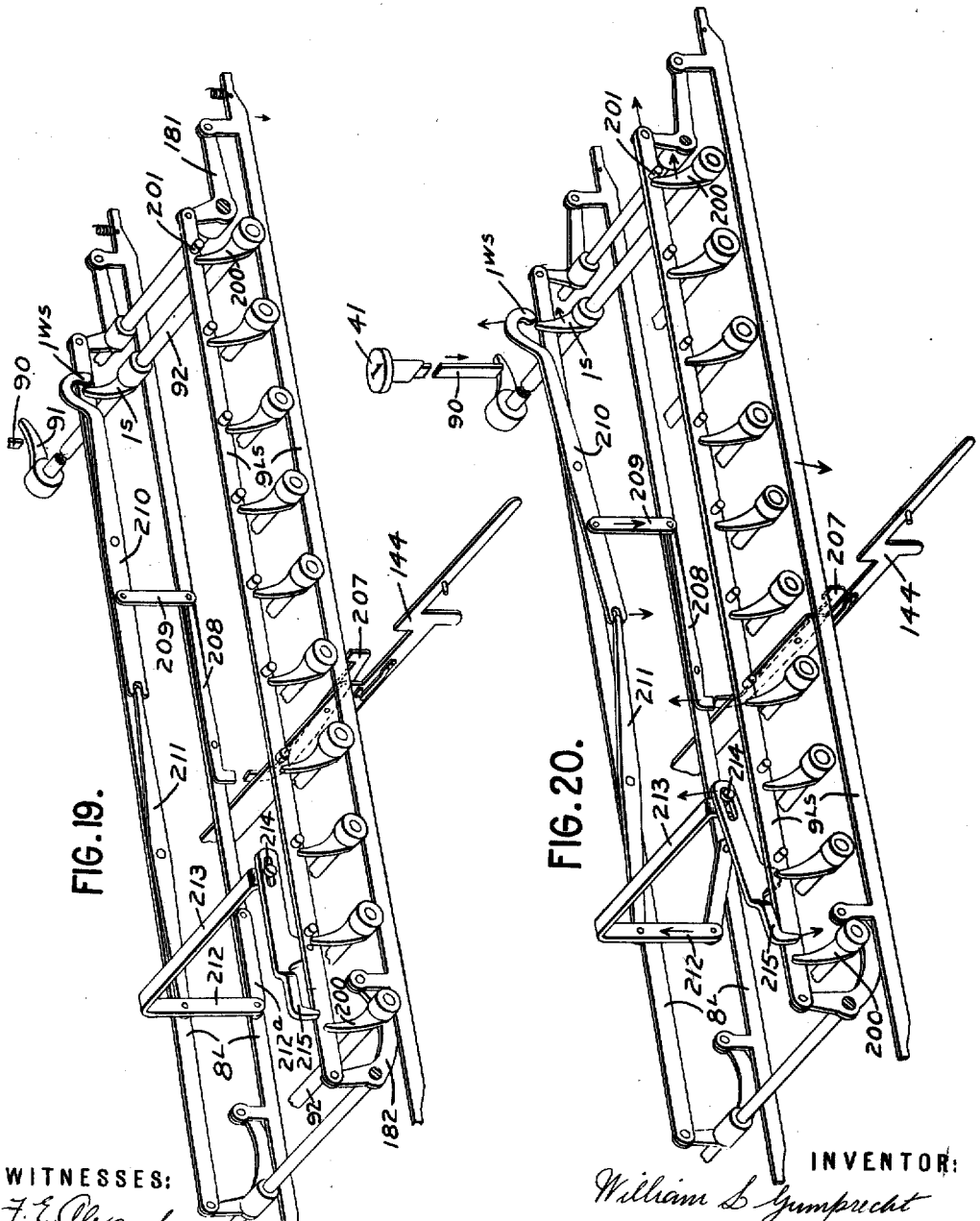

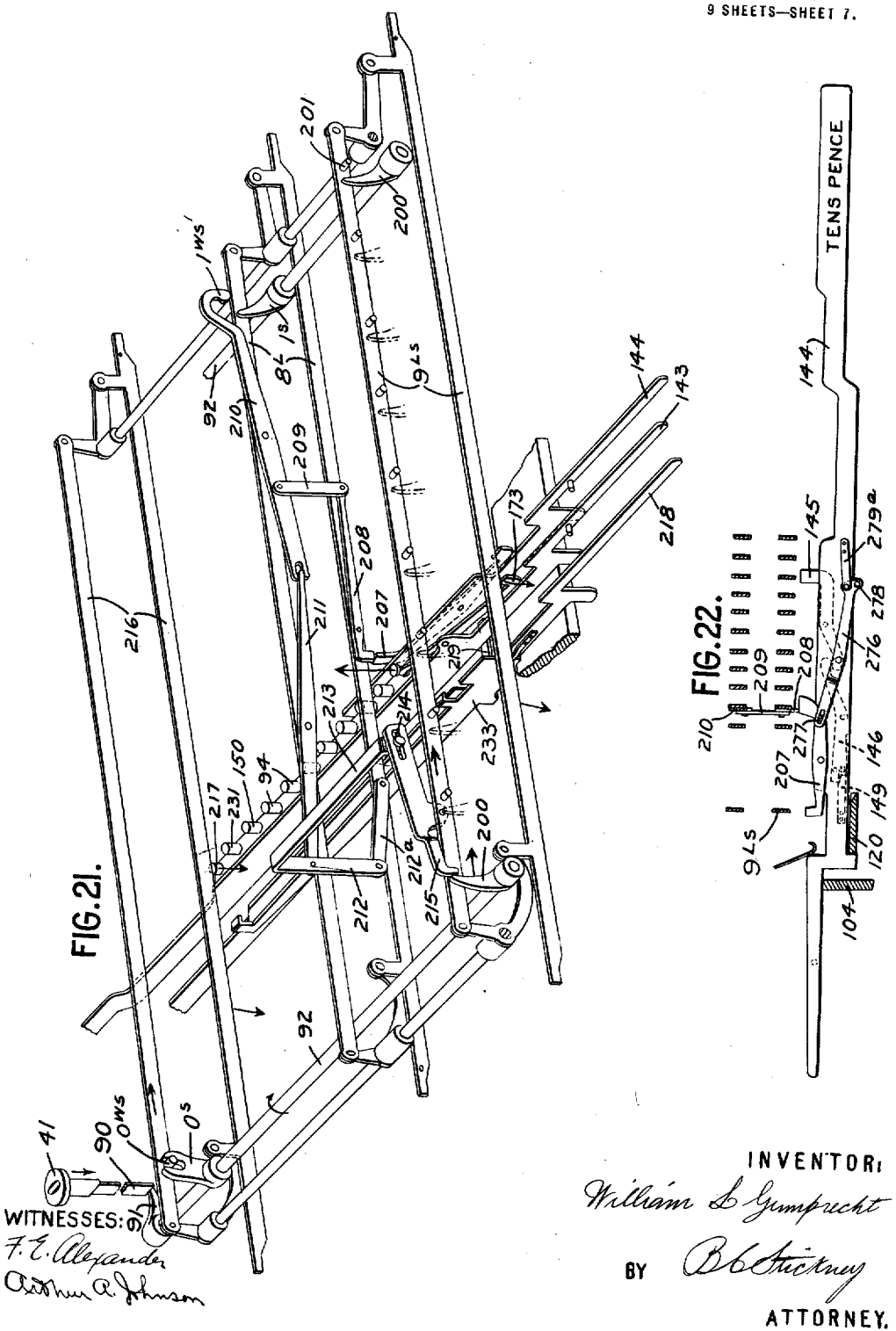

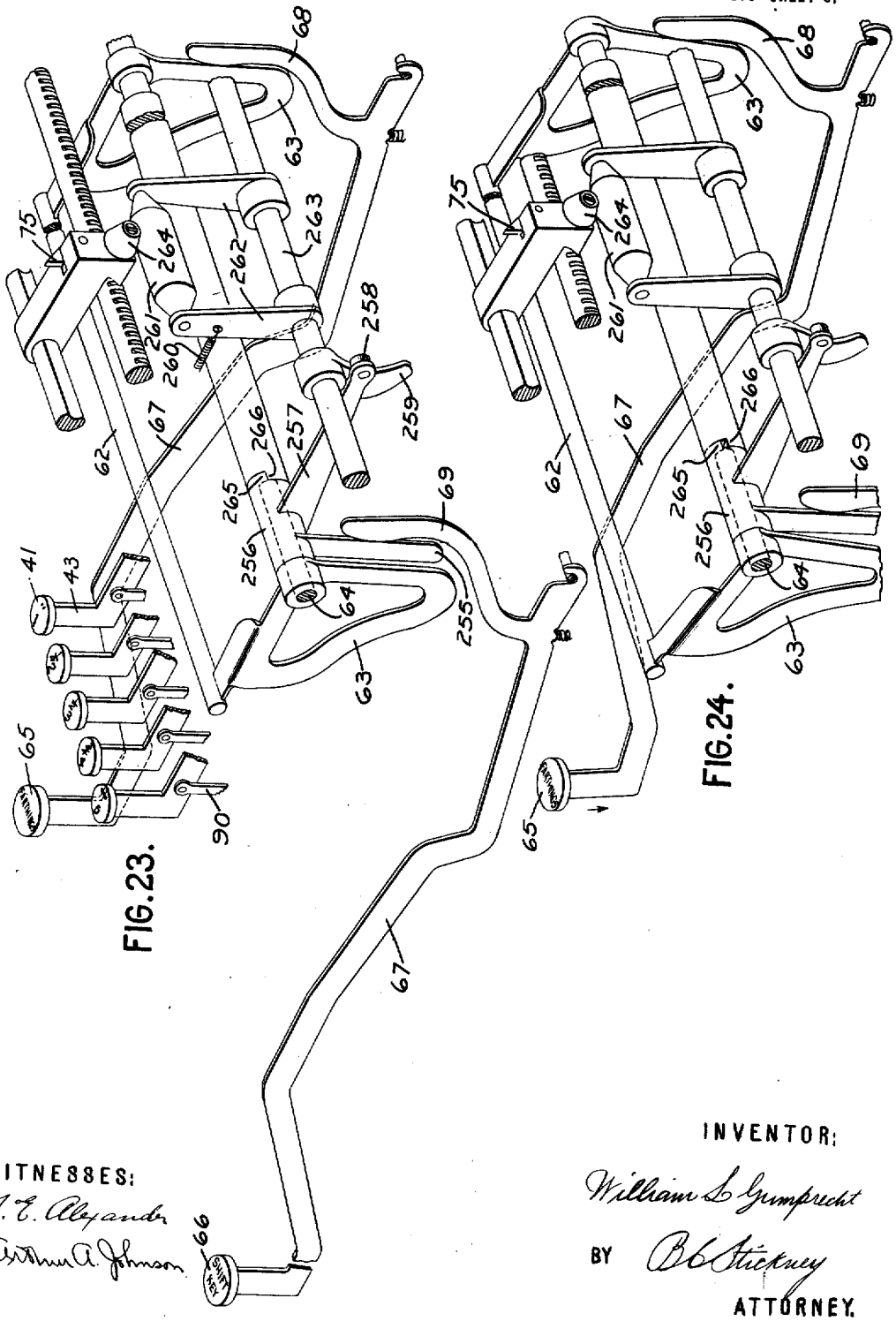

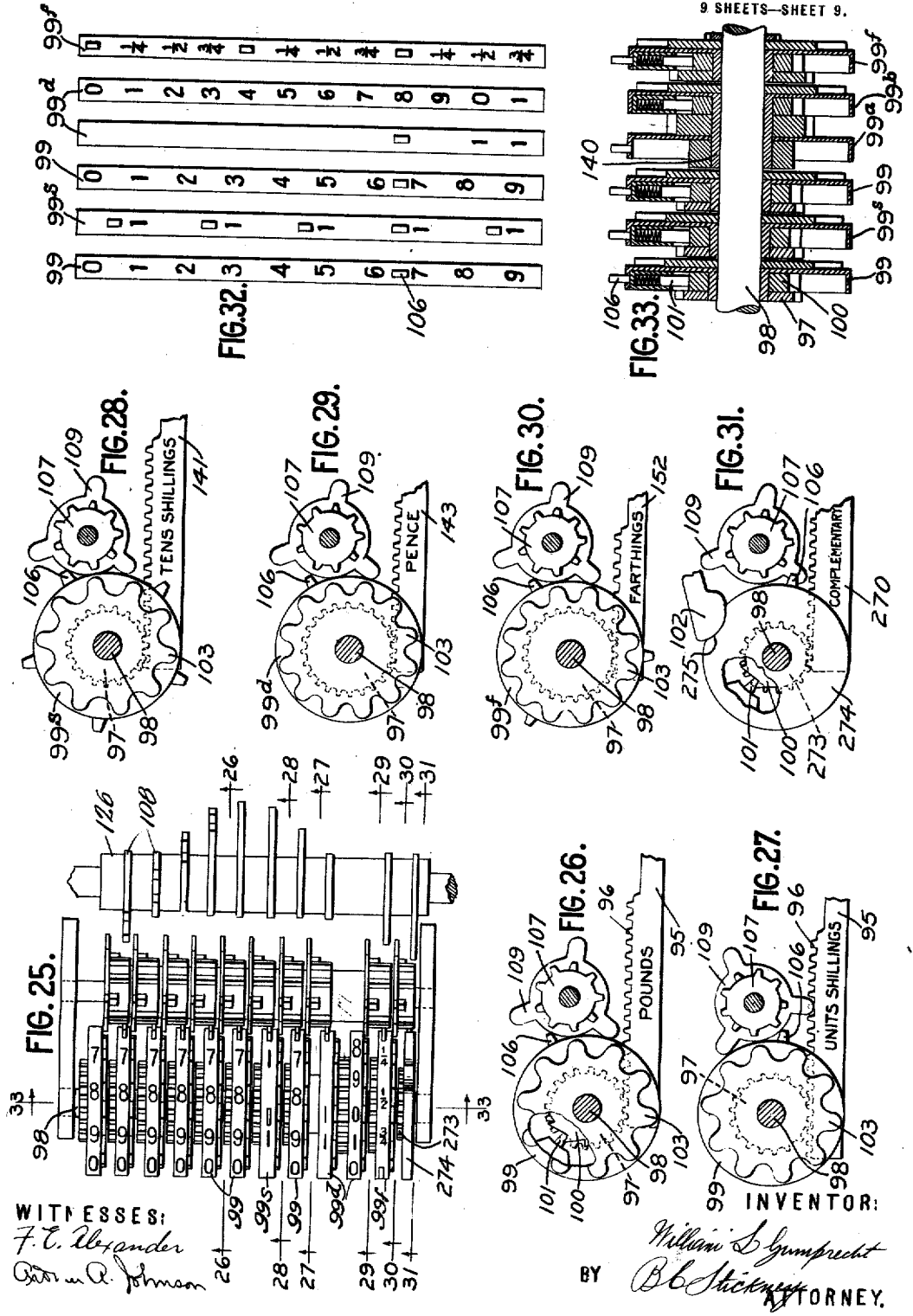

UNITED STATES PATENT OFFICE.

WILLIAM L. GUMPRECHT, OF HARTFORD, CONNECTICUT, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,338,012.      Specification of Letters Patent.      Patented Apr. 27, 1920.

Application filed February 1, 1916. Serial No. 75,542.

*To all whom it may concern:*

Be it known that I, WILLIAM L. GUMPRECHT, a subject of the King of Great Britain, residing in Hartford, in the county of Hartford and State of Connecticut, have invented certain new and useful Improvements in Combined Typewriting and Computing Machines, of which the following is a specification.

This invention relates to combined typewriting and computing machines of the Underwood-Hanson type, in which pins are set up by the actuation of the numeral keys, and subsequently employed to rotate the dial wheels of a register or computing head, as illustrated and described in United States patent to Hanson, No. 905,421, dated December 1, 1908, and pending application of F. A. Hart, Serial No. 466,836, filed December 10, 1908, (now Patent No. 1,270,411, dated June 25, 1918,) and is illustrated as an improvement on the applications of Hans Hanson, Serial No. 733,940, filed November 29, 1912; and Serial No. 626,550, filed May 11, 1911, (now Patents No. 1,279,688, dated September 24, 1918, and No. 1,278,812, dated September 10, 1918.)

The object of the present invention is to improve the computing mechanism in this general class of machines, with a view to providing a simple mechanism, adapted to be easily operated by the typist, and to effect both addition and subtraction according to the British monetary standard.

In machines of the Underwood-Hanson type, the typewriter numeral keys are adapted to set computation or index pins arranged upon rack-bars which mesh with pinions connected to the dial wheels, so that said pins may determine the extents to which the dial wheels are driven. The general system of subtraction employed in the present disclosure is analogous to that set forth in the application of Hans Hanson, Serial No. 626,550, filed May 11, 1911, wherein it is found advantageous to do subtraction by the complementary method. In the complementary method of subtraction, the numeral wheels may always turn in the same direction, and subtraction is effected by turning each wheel additively to an extent equal to the complement of the number it is desired to subtract.

Heretofore it has been supposed that in sterling machines it was practically essential to have a special key for the writing and computing of pence exceeding "9". According to the present invention, all the computing in every denomination may be effected by the usual ten numeral typewriter keys ranging from "1" to "9" and "0". It has been found possible to automatically make all mechanical changes necessary to perform this operation of computing sterling, while at the same time preserving the solid structure which has been found advantageous in the Underwood-Hanson machine, one of the features of said structure being that the rack-bars which do the computing may always move on fixed bearings, thus avoiding the necessity of supporting them by moving parts at any time. To obtain this result, it has been found advantageous to provide a single wheel on which all the pence are computed, and to drive this wheel by a single rack-bar. Where addition is to be performed, the driving of this rack-bar may be suitably modified by means of another bar for computing the pence exceeding "9" in value.

It has also been found advantageous to provide another bar for driving the pence rack-bar when subtraction is to be effected. In this way it has been found possible to preserve the ordinary pin-setting linkages with their light construction, so that they may extend entirely across the machine and set any number of pins simultaneously, without producing a heavy load on the numeral keys of the typewriter, thus avoiding the weakness which would result, were the pin-setting bars curved or not continuous across the machine. I have found it possible to obtain these results by altering the connections of only one or two of the numeral keys to their respective pin-setting bars, with the result that the machine is not only strong, but simple to repair and simple to build.

To obtain the above indicated results, I have found it advantageous to provide connections such that the carriage automatically shifts a bar which will enable the computing mechanism in the tens of pence column to automatically take care of whatever connections are necessary in the units of pence column. These connections may be automatically restored to their normal position whenever the usual general operator of the Underwood-Hanson machine is actuated.

I have further found it possible to utilize the same numeral keys for computing farthings, by providing that said farthings are automatically computed when the case-shift is operated to make the typewriter print in upper case, although except when farthings are being printed, the upper case of the typewriter may be utilized for printing non-computed items.

Other features and advantages will hereinafter appear.

In the accompanying drawings,

Figure 1 is a vertical section, taken from front to rear, with parts broken away for simplicity, the parts being shown in their normal adding position.

Fig. 2 is an enlarged fragmentary sectional view, taken from front to rear, showing the mechanism for setting the machine to subtraction, the mechanism for moving the pins into register with the setting mechanism, and the mechanism for restoring the pins to their normal position.

Fig. 3 is a side view of the tens of shillings pin bar.

Fig. 4 is a view of the units of pence pin bar.

Fig. 5 is a view of a supplementary bar used in connection with the units of pence bar.

Fig. 6 is a view of the farthings pin bar.

Fig. 7 is a view of the complementary pin bar used for driving the farthings dial wheel an extra digit distance, in subtraction.

Fig. 8 is a plan view of all the pin-bearing rack-bars, as they appear in the machine.

Fig. 9 is a fragmentary view of the tens of pence bar, showing the levers attached thereto which are used in addition.

Fig. 10 is a fragmentary plan view of the tens of pence and units of pence pin bars, and showing their relative position when about to depress the "1" numeral key in tens place when computing pence.

Fig. 11 is a plan view similar to Fig. 10, showing the action of the parts when adding eleven pence.

Fig. 12 is a plan view similar to Fig. 11, showing the action of the parts when adding ten pence.

Fig. 13 is a fragmentary plan view of the keyboard of a typewriter.

Fig. 14 is a diagrammatic side view, showing the parts when the shift key is depressed to move the platen to upper-case position, the computing mechanism being disconnected from the typewriter.

Fig. 15 is a fragmentary side view of the supplementary bar for driving the pence wheel, shown near the end of its forward stroke.

Fig. 16 is a side view similar to Fig. 15, showing the supplementary bar at the beginning of its return stroke, its interponent lever being restored to normal position.

Fig. 17 is a plan view of the pin-setting linkages and connected parts, the parts being shown in subtraction position.

Fig. 18 is a sectional view, looking toward the rear, on the line 18—18 of Fig. 17, showing the linkage normally associated with the "8" numeral key.

Fig. 19 is a fragmentary perspective view, looking from the rear, of the tens of pence bar and associated pin-setting linkages, showing the parts when the "1" numeral key is about to be depressed, in a subtraction computation, to print and compute "1" in tens of pence place.

Fig. 20 is a view similar to Fig. 19, showing the action of the parts during the depression of the "1" numeral key to print and compute "1" in tens of pence place.

Fig. 21 is a perspective view, looking from the rear, of the pin bars used in computing pence, and associated pin-setting linkages, showing the action of the parts when printing "0" and computing "10" in the units of pence column, in subtraction, after "1" has been printed in tens of pence column.

Fig. 22 is a side view of the tens of pence bar, showing the levers attached thereto used in performing subtraction.

Fig. 23 is a skeleton perspective view, looking from the rear, showing the platen-shift mechanism and its connections to the computing mechanism, the case-shift mechanism being in normal position.

Fig. 24 is a perspective view similar to Fig. 23, showing the position of the parts at the depression of the farthings-shift key, the usual shift key remaining in normal position.

Fig. 25 is an enlarged plan view of the computing head or register and associated carry-over mechanism.

Fig. 26 is a sectional side view on the line 26—26, showing one of the pounds dial wheels and associated carry-over mechanism.

Fig. 27 is a view similar to Fig. 26, on the line 27—27 of Fig. 25, showing the units of shillings dial wheel.

Fig. 28 is a view similar to Fig. 26, on the line 28—28 of Fig. 25, showing the tens of shillings dial wheel.

Fig. 29 is a view similar to Fig. 26, on the line 29—29 of Fig. 25, showing the pence dial wheel.

Fig. 30 is a view similar to Fig. 26, taken on the line 30—30 of Fig. 25, showing the farthings dial wheel.

Fig. 31 is a view similar to Fig. 26, taken on the line 31—31 of Fig. 25, showing the extra or complementary wheel which is used to add "1" to the farthings wheel in subtraction.

Fig. 32 is a development of the dial wheels shown in Fig. 25, showing the arrangement of the numerals on their peripheries and the relative position of their carry-over teeth.

Fig. 33 is an enlarged sectional view of the dial wheels shown in Fig. 25.

Numeral keys 41 and alphabet keys 42 are mounted at the front ends of key levers 43 to rock bell-cranks 44 to swing type-bars 45 provided with lower and upper case type 46, 47, to print on the front side of a cylindrical platen 48 mounted in the usual platen-shift frame 49 which is slidingly mounted for vertical movement on a typewriter carriage 50. Said typewriter carriage is adapted to travel laterally, step by step, in letter-feeding direction, there being provided for the purpose a spring barrel 51 which tends to move the carriage from right to left, said motion being controlled by heels 52, formed on the type-bars 45, and adapted to move rearwardly a universal bar 53 which actuates a pair of escapement dogs 54, 55, for engagement with an escapement wheel 56 connected to a pinion 57 which meshes with a rack 58 on the typewriter carriage 50 (Fig. 1).

Certain of the keys, as will be seen by reference to Fig. 13, are arranged to print two characters. In the case of the "2," "3" and "4" numeral keys, they are also used to print "1/4," "1/2" and "3/4" (of a penny), respectively, corresponding to one, two and three farthings in a computing zone. To enable the writing of these upper-case characters, the platen frame 49 is shiftable vertically, and to accomplish this is provided with a roller 61 on its lower end resting on a rail 62 of a shift frame 63, which is secured to a rock shaft 64, so as to be capable of swinging up and down to lift and drop the platen 48 with its frame 49. To swing the shift frame 63 to move the platen to upper-case position, two shift keys are provided, one at either side of the machine, the key 65 at the left of the machine being used when it is desired to compute farthings, and the key 66 is used when it is desired to print upper-case characters without performing any computation, as will hereinafter appear. The shift keys 65, 66 are mounted at the front ends of shift key levers 67 which have upwardly extending rear extensions 68 and 69, respectively, the extension 68 directly engaging the left rear end of the shift frames 63 (Fig. 23), to swing said frame at the depression of the shift key 65.

The mechanism thus far described is in itself old and well known in the Underwood typewriter, but coöperates with the computing mechanism. For this purpose, there is provided the usual register or gang of computing wheels, and associated with each computing wheel is a pin bar, forming a temporary computation register for indexing the amount to which its wheel shall be turned. The pins on the pin bars are normally inoperable by the numeral keys, because they are out of register with pin-setting devices, to be described below, but as the typewriter carriage travels along it automatically shifts these pin bars, one after another, to put their pins under the control of the numeral keys, so that the travel of the typewriter carriage determines in what pin bars or denominations the digits of a number shall be set up, and the numeral keys of the typewriter depress or set up pins on the bars to register the digits printed.

To bring this about, there is mounted on the carriage 50, so as to travel therewith, one or more denomination selecting tappets 75 (Figs. 1, 14, 23 and 24), according to the number of computing zones desired. Each tappet, as it travels from right to left with the carriage, in a computing zone, raises in succession, the front end of each one of a series of pin bar selecting jacks 76 (Fig. 1), the rear ends of which depress thrust rods 77, the lower ends of each of which are connected to rock levers 78 having upwardly extending fingers 79 (Fig. 2), each of which actuates its one of the usual nest of transposition linkages 82, these linkages being necessary to select the computation members one after another, beginning with the left hand one, because the typewriter carriage travels from the right. Each of these linkages rocks its bell-crank lever 85, the upwardly extending arms of which levers 85 engage wrists 86 on the rear ends of the pin-bearing bars 95, so that each thrust rod 77 will move forwardly its pin bar into register with a pin-setting mechanism by its lever 85 and thereby determine the denomination in which indexing is to take place. Thus the typewriter carriage determines both the denomination of indexing and printing, as is more fully described in the patent of Frederick A. Hart, No. 1,287,301, dated December 10, 1918, the connections being such that the pins on said bars 95 are brought *seriatim* into register with the pin-setting mechanism which will now be described.

The pins on the pin bars are, as intimated above, normally out of register with the pin-setting devices, but when any pin bar is moved into register with said devices, any numeral key 41 is adapted to set its pin 94 on that pin bar 95 by means of a pendent thrust link 90. The connections for doing this include an arm 91, fast to the front end of a rock shaft 92, said rock shaft having rigid thereon an upright rock arm 89, adapted to actuate its one of the nest of linkages 93, by moving said linkage downward. The downward movement of any numeral key causes its link 90 to strike its arm 91 to depress the linkage which depresses the corresponding index pin 94 on the pin bar, which at the moment has been moved forward into pin-setting position, all the other pin bars remaining in normal position, so that their pins are not in register with the linkage 93 actuated at the moment.

A general operator including a cross bar 120 (described below), is adapted to drive the pin bars 95, by the projecting ends of the depressed pins so that racks 96 formed at their forward ends (Figs. 8 and 26) drive dial pinions 97 loosely mounted on a shaft 98 which supports the dial wheels 99 of the computing head, said racks constantly meshing with said pinions. The pin or rack bars 95 are adapted to be driven forwardly and rearwardly to rotate their associated pinions in both directions.

The rack bars are supported on solid bearings at each end, said bearings being formed by the front comb 95ª and the rear comb 104. These solid bearings make the pin-setting operation easy and certain, because the pin bars cannot give or wabble during the pin-setting operation.

In order that the rack bars and their associated dial wheels may rotate idly backward, but drive their wheels when driven forwardly, there is fast on each dial pinion 97 a ratchet 100, the teeth of which engage a spring-pressed plunger 101 (Figs. 26 and 33) mounted on each dial wheel 99, so as to transmit to the dial wheel the rotation caused by the forward motion of its rack bar 95, through the intermediary of the dial pinion 97, ratchet 100 and plunger 101, but to allow the teeth of the ratchet 100 to pass the end of the plunger 101 during the return motion of the rack bars 95, the dial wheels being held against accidental rotation during said return motion by spring-pressed detents 102 (Fig. 1), which engage detent pinions 103 fast on the dial wheels, said detent pinions bearing as many teeth as there are digit spaces on the dial wheels.

The dial wheels are provided with one or more carry-over teeth 106 (Figs. 1, 32, and 26 to 30) of the usual Hanson type, adapted to start or partially rotate their associated carry-oven pinions 107 during the rotation of the dial wheels, to set up or initiate a carry-over action. The carry-over is subsequently completed during the rearward idle motion of the rack bars 95, at which time spirally arranged assisting segments 108 engage the partially rotated carry-over pinions 107, to cause a three-point pinion 109 fast to each of the carry-over pinions 107, to engage its detent pinion 103 of the dial wheel of next higher denomination, to rotate said dial wheel one digit distance. The carry-over teeth 106 are so placed on the dial wheels that they will initiate a carry-over action during the time that the dial wheels turn to "0," as seen through the usual sight-opening 110 in the casing of the machine (Fig. 1). This carrying action is more fully described and illustrated in Patent No. 816,319, issued March 27, 1906, to Hans Hanson.

To drive the rack bars 95 forward, after the pins 94 thereon have been set up, corresponding to the number to be computed, there is provided the general operator referred to above. To operate this, there is provided outside of the casing of the computing mechanism, a general operator handle 114, fast to a rock shaft 115, extending across the machine and journaled in the casing thereof. Fast on said rock shaft, at either side of the machine, are gear segments 116, meshing with and adapted to drive pinions 117 at the actuation of said handle 114, said pinions 117 meshing with horizontally disposed rack bars 118, slidingly mounted on either side of the machine and adapted to move forwardly at the forward stroke of the handle 114. Each rack bar 118 has fast thereon a bracket 119, uniting it to the cross bar or general operator 120, extending across the machine between the brackets 119 and adapted to engage the lower ends of the index pins 94 which have been depressed. On the forward stroke of the handle 114, the general operator bar 120 is moved forwardly through the intermediary of the segment 116, pinion 117 and rack 118, to engage the projecting ends of the depressed pins 94 and thereby drive forwardly the pin-bearing rack bars 95, on which said pins have been depressed, the racks 96 on the forward end of said rack bars transmitting their motion to their respective dial wheels. Thus each dial wheel is rotated a distance corresponding to the value of the numeral key 41 actuated when the typewriter carriage was holding its pin bar in pin-setting position.

On the return stroke of the general operator handle 114, the rack bar 118 and general operator 120 are moved rearwardly, the latter engaging downwardly projecting lugs 123 on the rack bars 95, to carry rearwardly said rack bars to their normal position, so that another computation may be indexed upon them.

As hereinbefore described, when a dial wheel 99 is rotated, so that its numeral "0" comes before the sight-opening 110, it will initiate a tens-carrying action, to complete which it is necessary to rotate the carry-over assisting segments 108. For this purpose, there is provided as in the Hanson Patent, 816,319, aforesaid, in mesh with the forward end of the rack 118, a gear 124, in mesh with a pinion 125, which has a one-way ball-clutch connection (not shown), with a shaft 126, on which are rigidly mounted the tens-carrying segments 108. The gears 124, 125 and the one-way clutch are constructed and proportioned so as to rotate the carrying segments 108 one revolution in clockwise direction (Fig. 1), to engage any pinions 107, on which a carrying action has been initiated during the forward stroke of the general operator, to complete said carrying action.

To restore the index pins 94, which have been depressed in a computation, to their normal ineffective position, there is provided the usual pin-restoring plate 136, which is actuated by the general operator. For thus actuating the plate, the general operator bracket 119 is provided with a pawl 129, pivoted thereon and drawn against a stop, which limits its forward motion, by a spring 130 (Figs. 1 and 2). The pawl 129 normally stands at the rear of an arm 131, fast on a rock shaft 132, which carries bell-cranks 133 loose thereon. The downwardly extending arms of said bell-cranks are connected by a link 134 to the downwardly extending arms of bell-cranks 135. The forwardly extending arms of the bell-cranks 133 and 135 carry a pin-restoring plate 136, pivotally connected thereto and extending under all the index pins 94 at a sufficient distance therebelow to allow said pins to be depressed when said plate is in normal ineffective position. The pin-restoring plate is operated as follows:—At the forward stroke of the general operator, the pawl 129 will move forward idly therewith, its upper free end engaging the arm 131 during the initial part of said forward stroke, and will be thrust rearwardly about its pivot against the tension of the spring 130 until the free end of the pawl 129 has passed clear of the arm 131. During this time the restoring plate 136 remains in its idle lower position. Near the rear end of the return stroke of the general operator 120, the free end of the pawl 129 will pass underneath the arm 131; the former being held against actuation by its stop, will force the arm 131 upwardly, to rock the shaft 132, swinging upwardly an arm 137, fast thereon (Fig. 1), the rear end of which is adapted to engage an extension on the pin-restoring plate 136, thereby forcing said plate upwardly against the lower ends of the depressed index pins 94 to carry said pins upwardly to their normal ineffective position, the parallel motion of the pin-restoring plate 136 being assured by the bell-cranks 133, 135, and link 134.

As hereinbefore stated, this machine is adapted to perform addition and subtraction, according to the British monetary standard. For this purpose, its computing head, pin-bearing rack bars and pin-setting linkages are constructed as follows:—

The dial wheels 99 of the computing head are constructed to display at the sight-opening 110, the result of the computations performed, in pounds sterling, shillings, pence and fractions of pence. For this purpose, each of the dial wheels which indicates pounds sterling has ten numerals equally spaced on its periphery, from "0" to "9" (Figs. 25, and 32), and bears one carry-over tooth 106, to initiate a single carry-over action in one rotation of the dial wheel. The construction and action of these pounds sterling dial wheels is like that of similar dial wheels in a decimal system, such as is shown in the Hanson Patent, 816,319, aforesaid. The dial wheel $99^a$, indicating tens of shillings (Figs. 25, 28 and 32), has the numeral "1" equally spaced five times on its periphery, a blank space being provided between five successive numerals "1" thereon, said blank spaces representing "0's", and like numerals, being adapted to appear at the sight-opening 110, as will hereinafter appear. The tens of shillings dial wheel consequently bears five equally spaced carry-over teeth 106, adapted to initiate a carry-over action whenever any numeral "1" on the dial wheel $99^a$ passes from the sight-opening 110. The dial wheel 99, indicating units of shillings (Figs. 25 and 27), is located to the right of the dial wheel $99^a$, as seen in Fig. 32, and is constructed like the dial wheels 99 of the pounds sterling order.

The dial wheel $99^d$, for indicating pence (Figs. 25, 29 and 33), consists of two united dial disks $99^a$, $99^b$, indicating at the sight-opening 110, tens of pence and units of pence, respectively, and are fast on a common sleeve 140, journaled on the dial wheel shaft like the dial wheels of other denominations. Said sleeve has loosely mounted thereon between said disks $99^a$ and $99^b$ a pinion 97 and ratchet 100 like the other dial wheels. The dial $99^b$ has twelve numerals equally spaced on its periphery running from "0" to "9", and also including an extra "0" and an extra "1", as seen in Fig. 32. On the dial $99^a$ stand the numerals "1" and "1" to indicate ten and eleven pence, when the numerals are read across both disks $99^a$ and $99^b$ at the sight-opening, the rest of the dial $99^a$ being left blank. The dial wheel $99^d$ is provided with one carry-over tooth 106, so placed thereon as to initiate a carry-over action when the numeral "11" on the combined dial wheel $99^d$ passes from the sight-opening 110.

The dial wheel $99^f$, indicating farthings or fractions of pence (Figs. 25, 30 and 32), has the numeral fractions "1/4", "1/2" and "3/4", arranged in progressive order on its periphery, each fraction appearing three times thereon, and has a zero or blank space of one digit distance between the numeral fractions "3/4" and "1/4", as seen in Fig. 32, the fractions "1/4", "1/2" and "3/4" being equivalent to one, two or three farthings. Said wheel may be termed the "farthings dial wheel", and is provided with three equally spaced carry-over teeth 106, arranged to initiate a carry-over action when the numeral fraction "3/4" passes from the sight-opening 110.

In order to rotate each dial wheel one digit distance for every unit in the number computed in the corresponding denomination, index pins are preferably equally spaced on the rack bars 95, which drive the dial wheels 99, and on every bar are arranged at the same distance from each other. The rack bars 95 of the pounds sterling order are each provided with nine such index pins 94, as in the ordinary Underwood-Hanson machine, arranged in such relation to the general operator cross bar 120 so that the general operator will move each rack bar forwardly during its forward stroke a distance equivalent to the digital value of the depressed index pin thereon. That is, when the foremost index pin 94 is engaged by the general operator 120, the rack bar will be moved forwardly to rotate the corresponding dial wheel one digit distance. When the rearmost pin 94 is depressed, the general operator 120 will move the rack bar 95 forwardly to rotate its corresponding dial wheel a nine digits' distance (Fig. 8).

Inasmuch as the tens of shillings dial wheel 99ᵃ (Fig. 28) is adapted to exhibit "0" at the sight-opening and initiate the tens-carrying action for every two digits' distance of its rotation, its associated rack bar 141 is provided with a single index pin 142, adapted to be depressed at the actuation of the "1" numeral key, and placed in line with the "1" index pins 94 of the pounds sterling rack bars 95, so that at the forward stroke of the general operator, the rack bar 141 will be moved forwardly one digit distance, through the intermediary of the pin 142, when said pin has been depressed.

Inasmuch as the units of shillings dial wheel 99 (Fig. 27) is of the same construction as the dial wheels in the pounds sterling order, its associated rack bar 95 is of the same construction as the rack bars 95 of the pounds sterling order.

Since the pence dial wheel 99ᵈ (Fig. 29) is unitary and is divided into twelve digits' distance, it is advantageously driven directly by only a single rack bar 143 (Figs. 4 and 8), which occupies a position corresponding to units of pence in relation to the other pin-bearing bars. This units of pence bar is adapted to be moved forwardly a maximum distance equivalent to eleven digits' distance rotation of the dial wheel 99ᵈ, namely, one point less than twelve pence or one shilling. When writing "1" in tens of pence place in a computing zone in addition, a bar 144 (Figs. 8, 9 and 12) is moved by the typewriter carriage like the pin bars 95, to coöperate with the units pin-setting bar, but this rack bar 144 instead of carrying pins, is adapted to coöperate with the units of pence rack bar 143 to move the latter ten or eleven points, depending on whether ten or eleven pence have been indexed. For the purpose of coöperating thus with the units of pence bar, the tens of pence bar 144 has pivoted, on the right side thereof, a lever of the first order 145, the forward end of which is adapted to be depressed at the actuation of the "1" numeral key when the latter is depressed, when the typewriter carriage 50 is in tens of pence place in a computing zone. Unless this lever is depressed, the general operator is ineffective on the tens of pence bar, but the depression of the lever 145 will raise the rear end thereof, rocking a coacting lever 146, also pivoted intermediate its ends on the bar 144, so as to place the rear end of said lever 146 into the path of the general operator cross bar 120. This lever 146 is held in either position by a spring detent 149. Said cross bar will then engage the rear end of the lever 146 on its forward stroke, to carry the bar 144 forwardly therewith and transmit thereto a forward stroke of eleven digits' distance. In order to transmit the forward motion of this tens of pence bar 144 to the units of pence rack bar 143, there is provided on the bar 144 a lug or projection 147 (Figs. 9 and 12), adapted to engage a lug 148 on the pence bar 143, to move the latter forwardly a ten digits' distance, to rotate its associated pence dial wheel 99ᵈ a similar distance. The gear 97 of the pence dial wheel 99ᵈ is so proportioned relative to the digit distance between the pins on the pence rack bar 143 as to rotate said dial wheel one digit distance, i. e., one twelfth of a rotation, for every one digit forward movement of the rack bar 143.

It will be noted that during the operation of adding ten pence, no pins will be set on the pence rack bar 143 when "0" is printed in units of pence place, as will hereinafter appear, the rack bar 143 in adding ten pence receiving its forward motion from the general operator cross bar 120, exclusively from the tens of pence rack bar 144. The relative position of the lug 148 on the bar 143 and the lug 147 on the bar 144 is such that the latter will move idly forward, prior to its engagement with the bar 143, a short distance, and after this lost-motion the bar 144 will drive the bar 143 by its lug 147 a distance sufficient to transmit to the bar 143 a forward stroke equivalent to a ten digits' rotation of the dial wheel 99ᵈ.

When it is desired to add eleven pence, it is necessary to rotate the dial wheel 99ᵈ eleven digits' distance. For this purpose, when actuating the "1" numeral key in tens of pence place is said computation, indexing will take place, as previously described, on the tens of pence bar 144, viz., the lever 146 is positioned as when the "1" numeral key was actuated in tens of pence place in the addition of ten, but, in order to move the rack bar 143 forwardly a distance equivalent to eleven digits' rotation of the dial wheel 99$^d$, through the intermediary of the rack bar 144, there is provided on the rack bar 143 a specially formed "1" index pin 150 (Figs. 4, 8 and 11), placed thereon and normally in line with the "1" index pins 94 on the rack bars of higher order. The index pin 150 is depressed at the actuation of the "1" numeral key in units of pence place, as will hereinafter appear, and is provided with a lug 151, normally out of the path of the lug 147 on the bar 144, said lug 151 being moved into the path of the lug 147 by the depression of the pin 150. This lug 151 will therefore then come into engagement with the lug 147 when the general operator drives forward the bar 144 and will cause its rack bar 143 to be carried a distance to cause an eleven digits' rotation of the pence dial wheel 99$^d$.

In computing a single penny nothing is written except the "1" in units place; consequently nothing is indexed except the "1" pin 150 on the units pence pin bar, with the result that the general operator drives the pence rack bar precisely as though it were an ordinary decimal rack bar, the lug 151 being ineffective because the tens of pence bar is unaffected by the general operator. In the same way, if it is desired to add more than one and less than ten in the units of pence column, any index pin 94 on the bar 143 is set up by the connections usual on Underwood-Hanson machines, which have been described above.

In order to rotate the farthings wheel 99$^f$ (Fig. 30) a digit distance corresponding to the numeral printed in farthings place in a computing zone, its associated rack bar 152 is provided with three index pins 94, so placed on the rack bar 152 as to enable said rack bar to be moved forwardly by the general operator 120 one, two or three digits' distance, corresponding to the addition of 1/4, 1/2 or 3/4 of a penny, respectively. The index pins on the rack bar 152 are placed in line with the index pins 94 on the bars of higher denomination. For the purpose of preserving the usual typewriter keyboard, the "2" numeral key writes "1/4" penny in upper case and actuates the foremost pin on the rack bar 152 (Figs. 6 and 8), as will hereinafter appear, when writing in farthings place on the work-sheet (Fig. 13). The middle and rearmost pins on the bar 152 are correspondingly so placed in line in relation to the other index pins 94 as to be depressed at the actuation of the "3" and "4" numeral keys, respectively, said keys being adapted to print the fractions "1/2" and "3/4" when the platen frame 49 is in upper-case position, and when computing in farthings place. The general operator is modified as described below, to rotate the farthings dial wheel 99$^f$ the digit distance represented by the pin set by the numeral key actuated.

When it is desired to perform complementary subtractions, the pins 94, of highest value on every one of the pin bars except the pence bar, have to be depressed before beginning the operation, as hereinbefore mentioned.

For this purpose, there is provided at the front of the machine (Fig. 1), a subtraction key 158, adapted to be pressed rearwardly and mounted on a thrust rod 159, the rear end of which is pivoted to an upright arm 160, fast on a rock shaft 161 (Figs. 1 and 2), on which is mounted a rearwardly extending pawl 162, adapted to engage and hold, in forward ineffective position, a subtraction bar 163 against the tension of a spring 164. Said subtraction bar is guided at its forward end by a slot 165, formed therein, engaging the general operator rock shaft 115, and guided at its rear end by a slot formed in a plate 166, which forms part of the framework of the machine. The subtraction bar 163 has an abutment 167 formed thereon, which engages the plate 166 on its rearward stroke, to limit its rearward motion when drawn by the tension of its spring 164, which holds it firmly in effective position. At the rearward movement of the subtraction key 158, the shaft 161 will be rocked, to force the rear hooked end of the pawl 162 out of engagement with a notch 168 formed in the subtraction bar 163, which is drawn rearwardly by the power of its spring 164. This sets the pin of highest digital value on each denomination, and for this purpose said subtraction bar carries rearwardly a bell-crank 169, pivoted thereto, the hook on the forwardly extending arm of which engages a trigger 170, fast on a rocking frame 171, to depress at the rearward stroke of the subtraction bar 163, a bail 172, which forms part of the framework 171 and overlies the levers 173 which engage the pins 94 of highest order of each of the rack bars, to depress said levers and pins. The upper end of the upright arm of the bell-crank 169 is adapted to engage an adjustable stop 174, so as to swing said bell-crank against the tension of the spring 175 near the end of the rearward stroke of the subtraction bar 163, thus moving the hooked end of said bell-crank downwardly, out of engagement with the trigger 170 of the rocking frame 171. This releases the rocking frame 171 from its depressed position, during the time that the subtraction bar 163 remains in its rearward subtracting position, and enables any of the pins 94, which have been depressed by the bail 172, to be restored to their normal ineffective position during indexing of numbers in a subtraction computation, as will presently be described.

As has been indicated above, the pins 94 are set for addition in an indexing operation, by operating the rock shafts 92, which coöperate with the numeral keys and have arms thereon, indicated in general by the reference numeral 89, which actuate the linkages, indicated in general by the reference numeral 93. Certain of these arms and linkages are now referred to specifically, according to their coacting numeral keys and the character of operation to which they correspond (Fig. 17), as arms $1^A$, $2^A$, $3^A$, $4^A$, $5^{AS}$, $6^A$, $7^A$, $8^A$ and $9^A$, which will engage, in their adding position, respectively, the wrists $1^{WA}$, $2^{WA}$, $3^{WA}$, $4^{WA}$, $5^{WA}$, $6^{WA}$, $7^{WA}$, $8^{WA}$, and $9^{WA}$, fast on their respective links $1^L$, $2^L$, $3^L$, $4^L$, $5^L$, $6^L$, $7^L$, $8^L$, and $9^L$, to swing the upper reach of their respective linkages leftwardly, as seen in Figs. 17 and 18, at the depression of the numeral key, to depress the lower reach of said linkage against the tension of its spring 180, through the intermediary of the bell-crank levers 181 and 182, forming a parallel motion device which is adapted to move the lower reach of said linkage downwardly.

It will be seen that on the depression of a numeral key in addition, except the "0" key, the linkage corresponding to the value of the numeral key depressed will be actuated to depress its corresponding pin 94 on the rack bar 95, which has been moved into position to coöperate with the linkages 93.

In order to set the arm and linkage mechanism 89, 93, to a subtraction condition, so that the numbers to be computed will be indexed to rotate the dial wheels a digit distance corresponding to the complements of the digits in the number to be computed, as described below, there is provided on each rock shaft 92 a subtraction rock arm which is ineffective while adding but effective while subtracting. To bring about this result, the subtraction bar 163 (Figs. 1 and 2), is provided with a pin 184 which is adapted at the rearward stroke of the subtraction bar to rock an arm 185, fast on a rock shaft 186, on which is mounted an arm 187 adapted to engage a pin 188 at the rear end of an extension 189 on a rock shaft-shifting bar 190 pivoted at 191, on the framework of the machine (Fig. 17), and extending across all of the arms 91. The lower end of said shifting bar 190 enters slots 192 formed on all of the rock shafts 92, so as to move them all simultaneously. It will be seen by reference to Figs. 1 and 2 that on the depression of the subtraction key 158 the shifting bar 190 will be swung on its pivots 191, through the intermediary of the subtraction bar 163, arm 185, rock shaft 186 and arm 187, to move the lower end of the shifting bar 190 forwardly and carry therewith all of the rock shafts 92 from the Fig. 2 (adding) to the Fig. 17 (subtracting) position, so that the rock arms $1^A$ to $9^A$, inclusive, will be shifted out of connection with their corresponding links and become ineffective, while a set of subtraction rock arms $1^S$, $2^S$, $3^S$, $4^S$, $5^{AS}$, $6^S$, $7^S$, $8^S$, $9^S$ and $0^S$ on the rock shafts 92 will be brought into coöperative engagement with wrists $1^{WS}$, $2^{WS}$, $3^{WS}$, $4^{WS}$, $5^{WS}$, $6^{WS}$, $7^{WS}$, $8^{WS}$, $9^{WS}$ and $0^{WS}$, respectively. The connections now are such that the depression of a numeral key will actuate the linkage corresponding to the complement of the value said numeral key represents. The word "complement," however, is not used for the true complement, but for the true complement less one. That is, in ordinary decimal numbers, the true complement of any number is that number deducted from ten. In the present machine the typewriter numeral keys, as mentioned above, are each said to set a complementary pin in subtraction, meaning thereby a pin having a value of one less than the true complement. Thus, in subtracting pence the "2" key sets up a condition equivalent to setting a "9" pin, and vice versa, because "12" is the base of computation and "9" is one less than the true complement of "2" to base "12."

It will be noted that on the pin bars of the pounds sterling order and the units of shillings pin bar, all the "9" pins 94, on said rack bars, (i. e., all the pins which represent the indexing of nine in addition), are depressed when the machine is set for subtraction, the depression of said pins representing the complementary indexing of "0". It is, therefore, necessary to reset each of said pins to its normal position when any other digit on its rack bar is set up. For this purpose, each of the rock shafts 92 is provided with the usual upright arm 200, normally out of engagement with a wrist 201, said wrists all being mounted on a universal "9" pin restoring linkage $9^{LS}$. At the end of the shifting forward of the rock shafts 92 in a subtraction-setting action, the arms 200 are brought into engagement with the upper reach of the linkage $9^{LS}$, on which are mounted the wrists 201, so that at the actuation of any numeral key from "1" to "9", said linkage will be actuated to depress its lower reach, said lower reach being adapted to depress the rear end of any lever 173 on the pin bar of the denomination in which indexing is taking place, thereby raising the forward end of said lever and its pin 94, and thus restoring said pin to its normal ineffective position simultaneously with the depression of any pin in the same denomination.

It will be noted by reference to Figs. 3 and 8 that the tens of shillings rack bar 141 bears only one pin 142. Under the method of computing used in this machine, it is advantageous in subtraction to depress the pin 142 simultaneously with the depression of the "9" pins on the bars of higher order. The pin 142 in subtraction representing the complement of "0" for the tens of shillings order. To bring this about, there is provided, (Fig. 3), nearer the rear end of the tens of shillings bar 141, a lever 202, the rear end of which normally underlies the pin-setting bail 172, to be depressed at the actuation of the latter, to raise the forward end of said lever which is connected with a lever 203, also pivoted to the bar 141, to depress the forward end of the lever 203 connected to the pin 142 to depress the latter.

When printing and subtracting "1" in tens of shillings denomination, it is necessary to unset the pin 142 so that "0" (i. e., nothing), which is the complement of "1" in tens of shillings place, will be indexed on the rack bar 141. For unsetting the pin 142, the forward end of the lever 202, when the bar 141 is in indexing position (Fig. 3), is adapted to underlie the lower reach of the linkage $8^L$ (which is the linkage operated by the "1" key in subtraction), so that the forward end of said lever will be depressed to reset the pin 142 at the actuation of the "1" numeral key. It will be noted by reference to Fig. 17 that the arm 200, associated with the "1" numeral keys, simultaneously actuates the linkage $9^{LS}$, which could be used to depress the forward end of the lever 202, but since the distance between the bail 172 and the linkage $9^{LS}$ is shown as short, it is advantageous to utilize the linkage $8^L$ for said purpose, because this permits a long lever 202. It may be noted in passing that the units of shillings rack bar 95 has the numbers to be computed in units of shillings place indexed thereon in subtraction, in the same manner as those indexed on the bars of the pounds sterling order.

When the typewriter carriage 50 comes to the point in a computing zone when tens of pence is to be computed and printed, the tens of pence bar 144 will be moved forwardly by the tappet 75, as has been described above for the other computation bars or rack bars, so that said bar 144 is in position to coöperate with the linkage or pin-setting mechanism 93. Said tens of pence bar, however, has no settable pins thereon, but is utilized nevertheless for controlling subtraction of pence and especially for setting the connections necessary for the subtracting of ten pence and eleven pence.

When it is desired to subtract ten pence the "1" and the "0" numeral keys are actuated in succession to print the number "10" on the work-sheet in the pence columns in the computing zone. At the down stroke of the "1" key in the tens of pence column, its rock shaft 92 will be rocked as usual with its arms $1^A$, $1^S$ and 200. The arm $1^A$ will rock idly, being out of engagement with its wrist $1^{WA}$ because of the fact that the rock shaft has been shifted into subtraction position. The arm 200 will depress the lower bar of the linkage, $9^{LS}$ by engaging with the wrist 201 thereon, and this linkage $9^{LS}$ is utilized for the purpose of computing tens of pence subtractively for preventing the setting up of any pin by the "1" key in the units of pence column if eleven pence is to be subtracted. This is necessary because, as will be pointed out below, the pence bar must remain idle if eleven pence is to be subtracted by the complementary method. For this purpose, there is pivoted on the tens of pence bar 144 (Figs. 8, 9, 19, 20, 21 and 22), a lever 207 of the first order. This lever is adapted to prevent the setting of a pin by the "8" linkage on said bar which normally would occur in the next column, because it always occurs if the numeral key "1" is operated, for subtraction in any column. To prevent such a setting the rock arm $1^S$ on the rock shaft 92 of the "1" key actuates the "8" linkage by a removable wrist $1^{WS}$, instead of by the usual type of wrist which is fixed to such a linkage. The actuation of the linkage $9^{LS}$ is caused to move this removable wrist to idle position when the "1" key is actuated in this tens of pence zone, thereby making the "1" key ineffective on any linkage, except the linkage $9^{LS}$. To bring about this result, there is pivoted on the bar 144 a lever 207, of which the rear end in a computing column underlies the "9" pin unsetting bar. The lever 207 at its forward upstanding end, underlies a transverse lever 208 pivoted on the lower reach of the "8" linkage, said lever being adapted to shift the wrist $1^{WS}$ to idle position. Therefore, whenever the "1" key is operated in this zone, the rear end of the lever 207 is depressed. This rocks the lever 208 to draw down a draw-link 209, pivoted to said lever at the end opposite from the lever 207, and this draw-link, being attached to a lever 210, pivoted on the upper reach of the "8" linkage, will swing said lever 210 at the depression of the $9^{LS}$ linkage, and thereby shift the wrist $1^{WS}$ to ineffective position, this being effected because said wrist is made integral with the opposite end of said lever 210. In addition to this, the actuation of the "1" key in tens of pence column enables the "0" key to restore the "9" pin if actuated in units of pence column. To do this, the lever 207 sets parts of the mechanism so that the 9$^{LS}$ linkage will be actuated if the "0" numeral key is actuated in the units of pence column. For this purpose, the lever 207, through the above-described draw-link, sets an interponent lug 215 in the path of the rock arm 200 on the "0" numeral key rock shaft, said arm being adapted to thereby actuate the 9$^{LS}$ linkage. This connecting up of the "0" numeral key is necessary because it will be remembered that the "0" numeral key in ordinary complementary subtraction never actuates the 9$^{LS}$ linkage. By causing the "0" numeral key to thus actuate the 9$^{LS}$ linkage, the "9" pin on the pence rack bar, which is set at the actuation of the subtraction bar, is caused to be reset, being provided for this purpose with the usual "9" pin-resetting lever.

The connections between the draw-link 209 and the interponent lug 215 include a lever 211, pivoted on the upper reach of the "8" linkage, which engages the end of the lever 210 by a tongue-and-groove connection, said lever forming part of a quasi parallel motion device, which includes a link 212$^a$ pivoted to the lower reach of the "8" linkage, and also includes a vertical link 212, and this vertical link actuates the lug 215 by means of a horizontal extension 213, extending rearwardly from the vertical link 212 over the pin-setting linkages and having a short downwardly extending arm forming a pin-and-slot connection 214 with the rear end of the lug 215, said lug being operated by said pin-and-slot connection, and for the purpose of being so operated is pivoted intermediate its ends on the upper reach of the "9" pin-resetting linkage.

The lever 207 is held in its effective position even when the tens of pence bar 144 is shifted back from indexing position to its normal position. For this purpose, the top of the front end of the lever 207 which cooperates with the lever 208 is long enough to support said lever 208 in both positions. The rear upturned end of the lever 207 is so short that it can be operated by the 9$^{LS}$ linkage only when in indexing position.

In addition to this special connection to the 9$^{LS}$ linkage, the "0" numeral key is adapted to actuate a special pin-setting linkage 216, said linkage being adapted to set its corresponding pin 217 on the front end of the pence rack bar. The purpose of setting this pin is to cause the pence rack bar to drive its pence wheel thereby to the extent of one digit space, this being done because complementary subtraction in pence requires that the indexing mechanism shall turn the pence wheel one space, to subtract 10, since ten pence is one less than eleven pence, and, as pointed out above, the indexing mechanism in a machine of the present complementary subtraction type, turns each numeral wheel one digit space less than the true complement (which for "10" to base "12" is "2") of the number to be subtracted. It will be remembered that the carry-over mechanism corrects the ensuing error by giving each numeral wheel an extra digit space turning in order to obtain the true result.

The description above of the adding operation by the general operator does not show how the pence rack bar can be driven directly thereby through any pin beyond the usual "1" pin 150. It will be remembered that a special device was utilized in the adding operation to enable the computation of numbers larger than "9". To effect complementary subtraction, a somewhat analogous device is provided which is effective for every number in complementary subtraction. The need for this arises from the fact that, as pointed out above, the complements employed in pence subtraction are computed from the base "12", whereas in ordinary decimal complementary subtraction, the complements are computed from the base "10". In both kinds of subtraction, however, one unit is added by the carry-over mechanism, so that, as also indicated above, the mechanism is built to enable numeral wheels to be driven by the pin bars or indexing mechanism to an extent as though the numbers were the complements of "9" and "11", respectively. The difference between ten and twelve, or, for that matter, between nine and eleven, is "2", and therefore means are provided to automatically cause the general operator to always drive the pence rack bar in subtraction two more digits than the digits represented by the pins actually set up. For this purpose, there is provided a supplementary operator 218, shown in Fig. 5, said operator being like the rack bars in general form, but lacking any teeth, because it drives the pence wheel exclusively through the pins on the pence pin bar. For this purpose it is provided with a horizontally extending lug 219 (Figs. 5 and 8), which rides behind any depressed pence bar pin and will drive said bar by said pin. To do this driving it is adapted to cooperate with the general operator 120 by means of a lever 223 pivoted on the operator 218, said lever having integral therewith a lug 225, which normally stands clear of the general operator. Said lug, however, is brought in front of the general operator whenever the subtraction key 158 is operated, so that the general operator will drive the supplementary operator 218 by the lug 225 and through the lug 219 give the pence bar the required extra drive of two digits. To do this, the lever 223 has an upwardly extending lug 224 which underlies the universal "9" pin-setting bar 172, with the result that whenever the "9" pin-setting bar 172 is actuated, it thrusts the rear end of the lever 223 downwardly to carry the lug 225 in front of the general operator.

In order to retain the lug 225 in either its effective or ineffective position, there is provided a spring detent 234, fast on the operator 218, which coöperates with suitable openings for holding the lever 223 in either its idle or effective position. The operator 218 normally travels with the general operator, but there is a lost-motion connection between the two, provided by the lug 219 which projects below the bottom of the operator 218, said lug being effective on the forward stroke, while the usual second lug 123, also fast on the operator 218, is effective on the rear stroke of the general operator. This last-named lug 123 normally holds the supplementary operator well forward of the general operator, so that the lug 225 may be shifted to effective position in the manner described above. For this purpose said lug 123 bears against the usual comb 104. The supplementary operator 218 tends to travel with the general operator and for this purpose is normally held in its rearward position by means of a spring 222, fast to a pin 221 on the general operator and to a second pin on the operator 218. The lug 219 during driving operation in addition has its front edge coincide with the front edge of the general operator 120, and for this purpose there is provided a recess 220 in the general operator adapted to accommodate the lug 219 and hold the front edge thereof in line with the rest of the general operator bar 120.

The result of these connections is that the supplementary operator 218 is an idle piece of mechanism in an ordinary addition operation, but in a subtraction operation said supplementary operator 218 becomes the driving mechanism or interponent through which the general operator of the machine is effective to drive the pence wheel through the necessary two digit spaces beyond what decimal wheels have to be driven in complemental subtraction. It will be further noted that the means for obtaining the extra drive necessary in computing ten and eleven pence in addition is practically a separate mechanism from that for producing the two extra digit units of turning of the pence wheel in subtraction. When subtracting eleven pence, however, the pence wheel is not turned at all by the indexing mechanism, but is turned a single unit space by the carry-over mechanism, in this manner corresponding precisely to the subtraction of nine on a decimal complementary subtraction machine, in which machines the wheel from which nine is to be subtracted is not turned, except by the carry-over mechanism. The reasons for treating "11" and "9" in this way are identical, viz., that they are both the numbers from which the complements are computed. Theoretically, they are each the largest digits in their respective bases of computation.

In a word, when "11" on the pence dial wheel $99^d$ appears at the sight-opening 110 and it is desired to subtract ten pence, there will be set up in the indexing mechanism of the machine, at the depression of the "1" numeral key in tens of pence place, a condition to be subsequently utilized when the "0" key is depressed in units of pence place, as hereinbefore described. It will be noted by reference to Figs. 8 and 17 that the parts of the indexing mechanism associated with the "0" numeral key are adapted to depress the foremost pin 217 on the rack bar 143. On the forward stroke of the general operator in subtraction, the extension 219 on the supplementary operator will engage the pin 217 to move the rack bar 143 forwardly one digit distance to rotate the dial wheel $99^d$ a similar distance, bringing the numeral "0" thereon to the sight-opening 110. On the return stroke of the general operator the dial wheel $99^d$ will be rotated one digit distance by the carry-over mechanism, and other mechanism, hereinafter to be described, thus bringing the numeral "1" on the pence wheel $99^d$ to the sight-opening 110, to register the difference between ten and eleven, namely, one, when subtracting ten pence from eleven pence.

When it is desired to subtract eleven pence in the above example, the same condition will be set up in the indexing mechanism when the "1" numeral key is depressed in tens of pence place in the subtraction of the eleven pence. When, however, the "1" numeral key is depressed in the units of pence place in said computation of eleven pence, its associated arm $1^s$ will swing clear of the wrist $1^{ws}$ on the linkage $8^L$ which will remain idle, but its associated arm 200 will actuate the linkage $9^{LS}$ (Fig. 17), to restore the lever 173 on the units of pence bar 143 to its normal position, and thereby reset the "9" pin 94 to its normal position, so that it will not be engaged by the supplementary operator 218. It will, therefore, be noted that in the operation of subtracting eleven pence no pins on the bar 143 have been depressed.

The description of pence subtraction is complete except for the subtraction of nine pence, which will now be described. It has been pointed out above that to complete complementary subtraction, owing to the difference between the base "10" and base "12," it is necessary to drive the pence rack bar 143 forward a two digits' distance in the subtraction of nine pence, "2" being the complement of "9" in pence computation. For this purpose, the rock shaft 92, which is associated with the "9" numeral key, has an arm 9$^s$, fast nearer its forward end, which engages a wrist 9$^{ws}$, fast on a linkage 230, the lower reach of which is adapted to depress an index pin 231 at the depression of the "9" numeral key in the subtraction of nine pence. It will be noted by reference to Fig. 8 that the index pin 231 is one digit distance in the rear of the index pin 217, which is depressed when indexing ten pence in subtraction. At the forward stroke of the general operator cross bar 120 and its associated supplementary operator 218, the pence rack bar 143 will be driven forwardly in a similar manner as in the subtraction of ten or eight pence, etc., but since the index pin 231, used in the subtraction of nine pence, is one digit distance in the rear of the "10" pence index pin 217, the rack bar 143 will be driven two digits' distance forward by the index pin 231, to rotate the pence dial wheel 99$^d$ a similar distance.

It will be seen, by reference to Figs. 1, 2, 5 and 8, that the extension 219 of the supplementary operator in its normal position is in close proximity to the rearmost edge of the pin-restoring plate 136. If during the rear stroke of the general operator the extension 219 should maintain its position of two digits' distance in advance of the general operator cross bar 120, the pin-restoring plate 136, when moving upwardly to reset the depressed pins, might strike against the extension 219 in case said restoring plate is actuated before the extension 219 has reached its extreme rearmost position. In order to avoid any possibility of collision between the pin-restoring plate 136 and the extension 219, it is advantageous to cause the supplementary operator 218 and its extension 219 to reach its normal rearmost position in advance of the general operator cross bar 120, and before the pin-restoring plate 136 is actuated. For this purpose the interponent 223, which is mounted on the supplementary operator 218, is provided with an extension 232 which is moved, at a subtraction setting of the machine, into the path of a lever 233 loosely pivoted on the pin-restoring plate 136. The forward end of said lever (Fig. 15) is adapted to be depressed idly during the forward stroke of the general operator by the extension 232 passing over it, the rear end of said lever being a counterweight to hold the forward end of the lever 233 in upper effective position by force of gravity. During the initial part of the return stroke of the general operator and supplementary operator (Fig. 16), the extension 232 of the interponent 223 will be brought into contact with the forward end of said lever, to cause the interponent 223 to be forced upwardly by the action of the cam face formed on its extension 232 acting against the forward end of the lever 233, as illustrated in Fig. 16, to move the rear end of the interponent upwardly and its abutment 225 out of engagement with the effective edge of the general operator cross bar 120, at which time the supplementary operator 218 will be drawn rearwardly by the power of its spring 222 to move the extension 219 into its recess 220 in the general operator cross bar 120. The general operator cross bar 120 and the supplementary operator 218 will now travel rearwardly in unison until the projection 123 on the supplementary operator is arrested by the guide comb 104 in its rearmost normal position, after which the pin-restoring plate 136 will be actuated during the completion of the return stroke of the general operator cross bar, during which time the extension 219 will be entirely out of the path of said pin-restoring plate. The interponent 223 is held in adding or subtracting position by the spring detent 234 fast on the bar 218, and is limited in its upward and downward motion by respective extensions 235, 236, abutting against the upper edge of the bar 218.

The base value of farthings, viz., the number at which it will carry-over to next higher order, namely, pence, is "4". It is therefore necessary to depress the index pin representing three farthings on the rack bar 152 when the machine is set to subtraction (viz., when the "9" pins of a decimal machine are depressed), this representing the indexing of "0", "3" being one less than the base value of farthings, and therefore the complementary number used when subtracting in farthings place.

For the purpose of setting the proper pin, there is pivoted at 238 to the farthings rack bar 152 a lever 239 (Figs. 6 and 8), the forward end of which normally underlies the universal pin-setting bail 172, to be depressed at the actuation of the latter. The rear end of the lever 239 has a loose connection at 240 with a lever 241, pivoted intermediate its ends on the rack bar 152, the forward end of said lever engaging the rearmost index pin on the farthings rack bar 152 to depress or raise said pin analogously to the "9" pins in decimal subtraction, as will presently appear. At the depression of the subtraction key 158, the bail 172 of the universal rock frame 171 is swung downwardly, as described above, thereby depressing the forward end of the lever 239 to raise the rear ends of the levers 239 and 241, to depress the forward ends of said levers and therewith the connected index pin, representing the indexing of "0" farthings. This will ultimately rotate the farthings dial wheel 99ᶠ three digits' distance, as required in the hereindescribed method of subtraction, in case no printing is performed in farthings place in a subtracting computation.

As was pointed out above, connections are provided whereby the "1" key after writing and computing subtractively in tens of pence is made ineffective to set a pin in the units of pence column (see description of wrist lever 210 above). To avoid the necessity of making this key again effective so that it will set a pin in farthings place, the numerals "1/4", "1/2", and "3/4", representing farthings, (Fig. 13) are placed on the "2", "3", and "4", numeral keys, and said keys are adapted to print the numerals "2", "3" and "4", respectively, in lower-case position, and to print "1/4", "1/2" and "3/4", respectively, when the platen 48 is in upper-case position, the indexing mechanism being correspondingly modified as described below.

When it is desired to compute farthings, the special shift key or farthings key 65 is depressed to swing the rear extension 68 thereof forwardly, swinging the shift frame 63, and raising the rail 62 and therewith the platen frame 49, to bring the printing point on the platen 48 opposite the upper-case type 47 of the numeral types, so that at the actuation of the "2", "3" and "4" numeral keys, the numerals "1/4", "1/2" and "3/4", respectively, will be printed in farthings place on the work-sheet in a computing zone.

It will be noted that the "2", "3" and "4" numeral keys will be actuated in addition to add one, two and three farthings. It will be seen by reference to Fig. 13 that the "2" numeral key represents the value of "2" in all denominations, except the farthings denomination, in which it represents the value of "1". It is therefore necessary that indexing to the value of "1" should take place at the actuation of the "2" numeral key when said key is being actuated in farthings place. For this purpose, the index pins 94 on the farthings rack bar 152, corresponding to "1", "2" and "3" farthings in addition, are respectively placed one digit distance toward the rear of index pins 94 of similar value on the rack bars of other denominations, so that the index pins representing the values of "1", "2" and "3" on the farthings bar will underlie the respective linkages 2ᴸ, 3ᴸ and 4ᴸ, associated with the respective numeral keys "2", "3" and "4", when said farthings bar is moved forwardly prior to indexing taking place thereon. For this reason, the universal cross bar 120 of the general operator has the notch 248 cut therein, the effective edge of which is one digit distance in the rear of the effective edge of the general operator cross bar 120.

In order to index the complementary value of one farthing at the depression of the "2" numeral key, there is provided on the rock shaft 92, associated with said key, a subtraction rock arm 246 adapted to engage a wrist 247 on the linkage 3ᴸ when the machine is set to subtraction, so as to depress the lower reach of said linkage at the depression of the "2" numeral key, to depress the middle index pin 94 on the farthings rack bar 152 (Fig. 8), this having been moved forwardly to pin-setting position by the type-writer carriage in stepping to the farthings zone.

During its forward stroke the general operator cross bar 120 will engage the depressed pin on said rack bar, but owing to the fact that a recess 248 (Figs. 6 and 8) is cut in the bar 120 at that point, it will move the latter forwardly only two digits' distance, to rotate the farthings dial wheel 99ᶠ (Figs. 30 and 32), a similar distance, said dial wheel receiving the necessary extra digit's rotation during the carryover.

In order to index the complementary value of two farthings on the rack bar 152, in subtraction, at the depression of the "3" numeral key, the arm 3ᴬ (Fig. 17) associated with the "3" numeral key engages a wrist 252 on the linkage 2ᴸ, the lower reach of which is adapted to depress the foremost index pin 94 on the rack bar 152 at the depression of the "3" numeral key, so that said rack bar and the farthings dial wheel 99ᶠ may be moved forwardly one digit distance at the forward stroke of the general operator.

In order to index the complementary value of three farthings on the rack bar 152 at the depression of the "4" numeral key, the pin-setting mechanism 93 is adapted to unset or restore the rearmost pin on the farthings rack bar 152 (Fig. 6) which was set when the machine was set for subtraction. This is accomplished by the rock arm 200, which is used to restore the "9" pin in ordinary complementary subtraction and is fast on the rock shaft 92 associated with the "4" numeral key. This arm in the usual manner actuates the linkage 9ᴸˢ to depress the lower reach thereof, which is adapted to engage and depress the rear end of the lever 239, pivoted to the farthings rack bar, when said rack bar is in indexing position. At the depression of the rear end of said lever, the forward end of the lever 241 connected thereto, is raised, and therewith the index pin 94, thus restoring said index pin to its normal ineffective position, so that no forward motion will be imparted to the rack bar 152 or rotation to the dial wheel 99ᶠ during the forward stroke of the general operator.

It will also be noted, by reference to Fig. 17, that the arms 2ˢ, 3ˢ and 4ˢ fast on the rock shafts 92, respectively, associated with the "2," "3" and "4" numeral keys, engage the wrists $2^{ws}$, $3^{ws}$, and $4^{ws}$, to actuate the linkages $7^L$, $6^L$, and $5^L$, at the depression of the "2," "3" and "4" numeral keys, respectively. It will be seen by reference to Figs. 6 and 8, that the farthings rack bar 152 has no pins provided thereon to coöperate with said linkages, the action of which is therefore idle when indexing is being performed in farthings place in a computing zone in subtraction.

It will be seen by reference to Fig. 13 that all the numeral keys 41 except the "2," "3" and "4" numeral keys, bear characters which have no numerical value, and for each of these there is provided on the associated type-bar 45 upper-case type 47 corresponding to said characters. It is advantageous when printing upper-case characters on numeral keys other than those corresponding to farthings, in a computing zone, to avoid indexing the value of the numeral key depressed. This may be accomplished by lowering the tappets 75 (Fig. 1) to an ineffective position, so that the jacks 76 will be out of the path of the tappets when the carriage 50 passes through a computing zone (Fig. 14).

In order to bring the writing line along the platen 48 opposite the upper-case type 47, the shift key 66 (Figs. 1, 13, 14 and 23) is depressed in the usual manner to swing forwardly the extension 69 of its lever 67. In the present machine said extension is adapted to lower the tappets 75 to an ineffective position. For this purpose said extension carries forwardly therewith an arm 255 (Fig. 14) fast on a sleeve 256 loosely mounted on the rock shaft 64 and having a rearwardy extending arm 257, at the end of which is mounted a roller 258 adapted to swing in clockwise direction (at Figs. 1, 14, 23 and 24), against the tension of a spring 260, an arm 259 on which said roller bears, thereby swinging rearwardly a roller 261 pivoted at its end to arms 262 which are fast on a rock shaft 263 on which is rigidly mounted the arm 259. Each tappet 75, (there being one for each computing zone,) is provided at its rear end with a conical roller 264 which is adapted to ride up on the roller 261 (Figs. 1 and 23), when the latter is in normal position corresponding to a lower-case position of the platen frame 49. When the shift key 66 is depressed to enable upper-case type 47 to print on the work-sheet wound around the platen 48, the roller 261 will be moved rearwardly from the Fig. 1 position to the Fig. 14 position, so as to be out of the path of the conical rollers 264 which, when said tappets enter the computing zone, will not ride up on the roller 261 but will remain in a lower ineffective position (Fig. 14) out of reach of the jacks 76. Said jacks will not be actuated by the tappets in the computing zone, if the shift key is depressed, and will therefore allow the pin-bearing bars to remain in their normal ineffective position, the linkage mechanism 93 being therefore idly actuated at the depression of numeral keys when the platen frame 49 has been moved to upper-case position by the shift key 66.

In order to transmit the downward motion of the shift key 66 to the shift frame 63 (Fig. 23) to move the platen to upper-case position, the sleeve 256 has a projection 265 formed thereon, adapted to engage a step 266 formed on the rock shaft 64 of the shift frame 63. Said step 266 abuts against the extension 265 when the shift frame 63 is in lower-case position and the shift key 66 is in normal position, so that at the depression of said shift key, the sleeve 256 and rock shaft 64 will rotate in unison, simultaneously moving rearwardly the roll 261 to ineffective position, and moving upwardly the platen 48 to upper-case position, thus disconnecting the computing machine from the typewriter when the platen has been moved to upper-case position by the shift key 66.

In order not to disconnect the typewriter from the computing mechanism when it is desired to actuate the "2," "3" and "4" numeral keys when the platen 48 is in upper-case position in a computing zone, so as to index fractions of pence, namely, farthings, the farthings shift key 65 is adapted to actuate the shift frame 63 without imparting any motion to the roller 261, so that the tappets 75 will be effective in a computing zone in letter-feeding direction. At the down stroke of the farthings shift key 65, the extension 68 of its lever 67 (Figs. 23 and 24) will rock the shift frame 63 to raise the platen frame 49 and platen 48 to upper-case position, so that the fractions "1/4," "1/2" and "3/4" may be printed in farthings place in a computing zone. It will be noted by reference to Fig. 24, that the step 266 formed on the rock shaft 64 of the shift frame will recede from the projection 265 on the sleeve 256 during the down stroke of said farthings shift key 65, during which time the sleeve 256 and its connected parts, including the roller 261, will remain in normal effective position to raise the tappets 75 to effective position when the typewriter carriage 50 is in a computing zone.

As hereinbefore mentioned, it is necessary to create a carry-over after registering the digits in complementary subtraction, and for this purpose it is necessary to carry-over onto the lowest unit or farthings wheel 99$^f$, after the dial wheels have been completely rotated by the pin-bearing rack bars. For this purpose there is provided a special or complementary rack bar 270, on which is provided a depressible pin 271 placed in line with the rearmost pins 94 on the other rack bars (Fig. 8). A lever 272 pivoted on said rack bar 270, is depressed by the universal pin-setting bail 172 when the machine is set for subtraction, and engages the pin 271 so as to thrust the lower end thereof into the path of the general operator cross bar 120, which during its forward motion engages the lower end of said pin to move forwardly the complementary rack bar 270 (Fig. 7), the forward end of which is constantly in mesh with a pinion 273 (Fig. 31), so proportioned, relative to the distance of forward movement of the rack bar, as to cause one revolution of said pinion at the forward stroke of the general operator. The pinion 273 is similar to the dial wheels and has fast thereon a similar ratchet 100, which coacts with a spring-pressed plunger or pawl 101, to transmit a rotation of one revolution to a disk 274 in one direction only. The disk 274, which has no numerals thereon, is placed to the right of the farthings dial wheel 99', so as to represent the imaginary next lower denominational order, and has a carry-over tooth 106 thereon, coöperating with the usual type of Hanson mutilated carry-over pinion 107, the connected three-point pinion 109 of which is adapted to carry-over onto the farthings dial wheel (Fig. 25). At every revolution of the disk 274 its carry-over tooth 106 will initiate a tens-carrying action on the associated carry-over pinion 107, 109, to be completed on the return stroke of the general operator in the usual manner, as hereinbefore described, and thereby rotate the farthings dial wheel 99' an extra digit's distance. This carry-over action may in turn cause a tens-carrying action to be carried through all the wheels in the usual manner. At the close of the carry-over operation, the computing wheels will show the correct result of the computation at the sight-opening 110. The complementary or carry-over initiating disk 274 need not be provided with a detent pinion 103, because it always is at one position when at rest, but has in its stead a concave portion 275 formed on its periphery, which is engaged by a dial detent 102, to prevent overthrow and to hold said disk in normal position against accidental rotation (Fig. 31).

In addition to completing the turning of the numeral wheels, the general operator is also adapted to reset the parts for a new computation, one of the resetting operations including the restoring of the pins on the pin bars, which has been described above. The general operator is also adapted to restore the lever 207, which was described above as being the device for causing the connection of the "0" numeral key to the "9" pin-restoring link 9$^{LS}$. To do this, the general operator cross bar is provided on its front edge, as seen in Fig. 22, with a cam face, which is adapted to strike a similar cam face 278 on a restoring lever 276, which is pivoted on the tens of pence bar and engages the lever 207 at its rear end by means of a pin-and-slot connection 277. The cam face 278, at the front end of said lever, is struck by the general operator toward the end of the forward movement thereof, with the result that the general operator rides under the lever 276 and positively restores the lever 207 to its normal ineffective position. The lever 207 was described above as remaining in set position, so as to hold the lug 215, controlled thereby, effective, and, for the purpose of holding it thus effective, the lever 276 is detained in either its effective or ineffective position by means of a spring detent 279$^a$, fast on the tens of pence bar; said detent adapted to coöperate with one of two openings on the lever 276.

The levers mounted on the "8" linkage, including the levers 210, 211, etc., are restored to their normal ineffective position by gravity as soon as the lever 207 allows them to drop to their normal positions. This gravity-repositioning of the levers is obtained merely by adjusting the centers on which they are pivoted in such a way as to bring the weight of the bodies of the levers in proper position to make gravity effective in the desired manner, thus avoiding the necessity of putting loading members on said levers. For the purpose of restoring the lever 146 to its normal position, said lever is provided with a hump 279, near the pivot 280 thereof; said hump adapted to be struck by the pin-restoring plate 136 to cause the lever 146 to be restored thereby in the same manner as the plate restores the pins.

In certain operations of the machine, various extra pins are set up, and for these no means is provided for automatically restoring them before the end of a computation, this being unnecessary because said pins are ineffective on account of their position, which prevents the general operator from reaching them during a computation. These pins, of course, are restored precisely as the effective pins, by the pin-restoring plate 136.

The subtraction bar 163 is automatically brought back to ineffective position by means of the general operator, through the usual lug 281, which is adapted to be struck by the general operator toward the end of its forward movement. When the general operator strikes this lug, it carries the subtraction bar forward and permits said bar to be caught by the dog 162, which normally holds it, said dog being drawn to effective position by the spring 282 (Fig. 1).

Variations may be resorted to within the scope of the invention, and portions of the improvements may be used without others.

Having thus described my invention, I claim:

1. In a computing machine, the combination with ten computing keys from "0" to "9", inclusive, of a set of indexing devices associated with said keys including devices controlled by said "0" key and the "1" key, computing wheels adapted to be operated as determined by said indexing devices to compute in decimal numerals and also numerals to a higher base than decimal numerals, and connections whereby said keys, including said "0" key, through said indexing devices including those controlled by said "0" key, may effect complementary subtraction of said wheels in both decimal and non-decimal calculations, said connections including means whereby the "1" key may be effective to determine the turning of a wheel either less than ten decimal units or more than ten decimal units.

2. In a combined typewriting and computing machine, the combination with ten typewriter numeral keys from "0" to "9", inclusive, and a traveling carriage, of a set of indexing devices associated with said keys including devices controlled by said "0" key and the "1" key, computing wheels on which the denominations are selected by said carriage, said wheels adapted to be operated as determined by said indexing devices to compute in decimal numerals and also numerals to a higher base than decimal numerals, and connections whereby said keys, including said "0" key, through said indexing devices including those controlled by said "0" key, may effect complementary subtraction of said wheels in both decimal and non-decimal calculations, said connections including means whereby the "1" key may be effective to determine the turning of a wheel either less than ten decimal units or more than ten decimal units.

3. In a computing machine, the combination with ten numeral keys adapted to normally compute in decimal units, of computing wheels under the control of said keys adapted to compute in both decimal and non-decimal units, the non-decimal units having a base greater than ten, a general operator for driving said wheels simultaneously to effect either addition or complementary subtraction, settable index members for determining how far said wheels shall turn, a single set of index-setting members universal to said settable members and an interponent driven by said operator to make said operator selectively turn certain of said wheels an amount determined by their settable members, and said non-decimal wheel a greater amount than that represented by said settable device.

4. In a computing machine, the combination with a single set of ten numeral keys, of a denomination selector, a set of computing wheels selected by said selector, a settable indexing device for each wheel, a single set of setting devices for said indexing devices operated by said keys, and means whereby said denomination selector may cause the key operated to disconnect itself from the setting device.

5. In a machine for computing values expressed, in part, in units of a non-decimal system and comprising decimal number wheels, each bearing a "0" and the numbers "1" to "9", inclusive, actuating mechanism, including a driving element, for each of said wheels, settable indexing devices for each driving element for determining its extent of movement at each computing operation, a set of ten number keys representing "0" and the numbers "1" to "9", inclusive, means controlled by said keys for setting said indexing devices, and a general operator for moving said driving elements in accordance with the settings of said indexing devices, the combination, with a non-decimal number wheel, bearing a "0", the numbers "1" to "9", inclusive, and additional numbers running above "9", of actuating mechanism, including a driving element, for said non-decimal wheel, indexing devices, settable by said key-controlled setting means, to determine movements of the driving element of said non-decimal wheel of from one to nine steps, and a settable interponent through which a driving relation may be established from said general operator to the driving element of said non-decimal wheel, said interponent being settable by a part of said setting means controlled by one of said keys and determinative, when set, of a movement of the driving element of said non-decimal wheel of more than nine steps.

6. In a machine for computing values expressed, in part, in units of a non-decimal system and comprising decimal number wheels, each bearing a "0" and the numbers "1" to "9", inclusive, actuating mechanism, including a driving element, for each of said wheels, settable indexing devices for each driving element for determining its extent of movement at each computing operation, a set of ten number keys representing "0" and the numbers "1" to "9", inclusive, means controlled by said keys for setting said indexing devices, and a general operator for moving said driving elements in accordance with the settings of said indexing devices, the combination, with a non-decimal number wheel, bearing a "0", the numbers "1" to "9", inclusive, and additional numbers running above "9", of actuating mechanism, including a driving element, for said non-decimal wheel, indexing devices, settable by said key-controlled setting means, to determine movements of the driving element of said non-decimal wheel of from one to nine steps, a settable interponent through which a driving relation may be established from said general operator to the driving element of said non-decimal wheel, said interponent being settable by a part of said setting means controlled by one of said keys and determinative, when set, of a movement of the driving element of said non-decimal wheel of more than nine steps, and a second interponent carried by the driving element of said non-decimal wheel, and also settable by part of the setting mechanism controlled by one of said keys, to coöperate with the first-mentioned interponent, when both are set, to effect a still greater movement of the driving element of said non-decimal wheel.

7. In a computing machine, the combination with a computing section for computing in decimal units, said section comprising number wheels, each bearing a "0" and the numbers from "1" to "9", inclusive, and actuating mechanism for said wheels comprising settable indexing devices determinative of the degree of rotation of said wheels, of a computing section for computing in non-decimal units in accordance with a base greater than ten, said non-decimal computing section comprising a numeral wheel bearing a "0", the numbers "1" to "9", inclusive, and additional numbers running higher than "9", and actuating mechanism therefor comprising settable indexing devices and interponents capable of being set in coöperative relation therewith, to determine the degree of rotation of said non-decimal numeral wheel, a single set of ten numeral keys representing "0" and the numbers "1" to "9", inclusive, means controlled by said keys for effecting settings of the indexing devices of said decimal computing section determinative of numeral-wheel rotations of from one to nine steps, and for effecting settings of the indexing devices and one of said interponents of said non-decimal computing section determinative of numeral-wheel rotations of from one to a number of steps exceeding nine, a subtraction-setting device comprising means for setting certain of said indexing devices and for changing the relation of parts of said index-setting means so as to effect settings for subtraction by complemental addition, said subtraction-setting device also comprising means for setting another of said interponents so as to coöperate with any set indexing device of said non-decimal computing section, and thus determine a movement of greater extent than that normally determined by that indexing device, and a general operator for effecting rotations of all of said numeral wheels in accordance with the settings of said indexing devices and interponents.

8. In a computing machine, the combination with indexing devices, of computing wheels on which complementary subtraction is adapted to be effected by said indexing devices, ten numeral keys ranging from "0" to "9", connections whereby said keys may be effective on said indexing devices to cause one of said wheels to compute to a base higher than ten, driving means for causing said indexing devices to be effective on said wheels, an interponent forming part of said indexing devices adapted to be made effective by said connections additively to cause one of said wheels to compute to a higher base than ten, and another interponent adapted to be made effective by said keys subtractively for causing said last-named wheel to compute to said higher base subtractively.

9. The combination with a single set of ten numeral keys ranging from "0" to "9", of computing wheels, some of which are adapted to compute to the base ten and another to a base less than 10, a separate set of indexing devices for each wheel according to the base to which the wheel computes, and connections from the "1" key and the "0" key to enable them to be variably effective on said devices to effect either addition or complementary subtraction on the wheels.

10. In a combined typewriting and computing machine, the combination with ten typewriter numeral keys ranging from "0" to "9", of computing wheels, some of which compute to the base 10, another of which computes to a smaller base, another of which computes to a higher base, and another computes to still another base, indexing devices for said wheels varying according to the base, connections whereby the "1" key and the "0" key may be variably effective on said indexing devices to effect addition or complementary subtraction to three of said bases, and connections from others of said keys to enable said other keys to effect either addition or complementary subtraction to the other base.

11. In a computing machine, the combination with indexing devices comprising settable members, of setting members universal to said indexing devices, keys for operating said setting members, means for readjusting said indexing devices and their setting members to set said machine for subtraction, an unsetting member adapted to be operable by some but not all of said keys when said machine is set for subtraction, and connections whereby one of said keys, normally unable to operate said unsetting member, is automatically made effective thereon to effect a subtraction setting of one of said indexing devices.

12. In a computing machine, the combination with settable members forming indexing devices, of keys, setting members operated by said keys and universal to said indexing devices, an unsetting member common to most of said keys, and connections whereby said unsetting device makes one of said keys ineffective on its setting member.

13. In a computing machine comprising denomination-selecting means, settable indexing devices, key-controlled devices for setting said indexing devices and means for readjusting parts of said devices, so as to set said machine for subtraction by complemental addition, in combination, a device for restoring set indexing devices, a key, a key-connection through which said key may operate said restoring device when said machine is set for subtraction, a connection normally effective at such time, between said key and a selected element of said index-setting devices, and a normally ineffective mechanism capable of being rendered effective by a part of said denomination-selecting means, when actuated, and capable, when thus rendered effective, and when said machine is set for subtraction, of being so operated by said key and said first-mentioned key-connection, through the intermediary of said restoring device, as to disable the connection from said key to the selected element of said index-setting devices.

14. In a computing machine comprising ten numeral keys, the combination with computing wheels adapted to compute to a higher base than ten and also to compute to base ten, of setting devices for determining how far each wheel shall compute, setting devices operated by said keys and universal to said setting devices for determining how far said computing wheel shall turn, and connections whereby when said keys are effective in a non-decimal computation zone any setting device adapted to give a wheel a wrong rotation is disconnected from the key operating it.

15. In a computing machine adapted to effect complementary subtraction automatically and having devices settable when beginning such subtraction, the combination with a device adapted to unset said devices, of numeral keys adapted to operate said unsetting device, and connections whereby a key may be automatically selectively connected to or disconnected from said unsetting device.

16. In a computing machine, the combination with ten numeral keys and a traveling carriage, of computing wheels on which said keys are adapted to compute numbers both decimally and non-decimally, indexing devices operated by said keys for controlling said wheels, and means whereby one of said keys is always connected to said indexing devices, and another of said keys is selectively connected thereto at certain points in the travel of said carriage.

17. In a computing machine, the combination with ten numeral keys and a traveling carriage, of computing wheels on which said keys are adapted to compute numbers both decimally and non-decimally, indexing devices operated by said keys for controlling said wheels, means whereby one of said keys is always connected to said indexing devices, means whereby one of said keys is selectively connected to operate its indexing device at certain points in the travel of said carriage, and connections controlling said last-named means adapted to be operated by one of said keys at a given position of said carriage.

18. In a computing machine, the combination with a pair of index-setting linkages, of a lever pivoted on one linkage, connections for operating said linkage by said lever, and connections whereby the lever is controlled by the other linkage.

19. In a combined typewriting and computing machine, the combination with numeral wheels and a single set of typewriter numeral keys, of indexing devices for said wheels controlled by said keys and adapted to effect complementary subtraction, a traveling carriage, and means whereby said indexing devices are automatically operated in one zone to effect such subtraction to one base and in another zone to another base.

20. In a combined typewriting and computing machine, the combination with numeral wheels and a single set of typewriter numeral keys, of indexing devices for said wheels controlled by said keys and adapted to effect complementary subtraction, a traveling carriage, means whereby said indexing devices are operated in one zone to effect such subtraction to one base and in another zone to another base, index-setting devices connected to said keys, and means whereby said index-setting devices are effective in one zone in one way and in another zone in another way.

21. In a combined typewriting and computing machine, the combination with a single set of typewriter numeral keys and a case-shift mechanism, of means for operating said case-shift mechanism and to automatically make said keys ineffective for computation; and other means for operating said case-shift mechanism and for causing said keys to remain effective to compute.

22. In a combined typewriting and computing machine, the combination with a case-shift mechanism, of two devices for operating said case-shift mechanism, typewriter numeral keys, and computing wheels, one of said case-shift mechanisms being adapted to disconnect said keys from their wheels, and the other adapted to shift the case while said keys remain connected to said wheels.

23. In a combined typewriting and computing machine, the combination with a case-shift mechanism, of a device for operating said mechanism, typewriter numeral keys, computing wheels in which said keys are adapted to effect computations, a second device for operating said mechanism, a rock-shaft by which said latter device operates said case-shift mechanism, and connections, extending from said rock-shaft, adapted to make said keys ineffective on said wheels.

24. In a computing machine, the combination with a numeral wheel and an indexing device therefor having a rectilinear motion, of a settable member on said indexing device, and a restoring member for said settable member, said restoring member comprising a gravity pawl, a cam on said gravity pawl, a coöperating cam on the settable member, means whereby said gravity pawl is ineffective on the forward stroke of said device and effective on the return stroke thereof, and a pin-restoring plate on which said pawl is mounted.

25. In a combined typewriting and computing machine, the combination with typewriter numeral keys and a traveling carriage, of a denomination selector associated with said carriage, a platen-shift for said carriage, a shift frame, two keys for operating said frame, a disconnect roll for said selector, and means for operating said disconnect roll by one of said shiftable keys, and not by the other.

26. In a computing machine adapted to compute to the base two and also to the base ten, the combination with indexing devices adapted to be set for complementary subtraction, of a universal member for so setting certain of said devices, a universal member for restoring the set devices, and two levers through which said universal members may set and restore the indexing device which computes to the base two.

27. In a computing machine, the combination with a set of indexing devices and a set of setting members therefor, of keys for operating said setting members, connections between said keys and said setting members whereby they are operated, said connections including a member between a key and its setting member adapted to be variably set by another setting member, and a member, settable by one setting member, forming a controlling device for the variably settable connection.

28. In a combined typewriting and computing machine, the combination with numeral wheels adapted to compute to both the base ten and the base twelve, of a general operator for said wheels, complementary subtraction devices therefor, an interponent for the wheel adapted to compute to base twelve for causing said operator to drive said wheel in addition, and a second interponent for causing said operator to drive said wheel differently in complementary subtraction.

29. The combination with computing wheels, a series of rack-bars, and settable pins on each rack-bar for driving its computing wheel, of a general operator for driving said rack-bars, a movable bar tending to move with said operator to drive one of the rack-bars by its set pin, and means for causing said movable bar to be variably positioned relatively to said operator to drive its bar variably by the same set pin.

30. A computing machine comprising, in combination, a non-decimal number wheel bearing a "0" and numbers running consecutively from "1" to above "9", of actuating mechanism therefor, including a driving element, settable indexing devices determinative of movements of said driving element of from one to nine steps, a set of ten number keys representing "0" and the numbers "1" to "9", inclusive, denomination-selecting means, means controlled by said keys and selectively rendered effective by said denomination-selecting means for setting said indexing devices, and an interponent settable by the part of said index-setting means controlled by the "1" key when rendered effective by a part of said denomination-selecting means, said interponent being determinative, when set, of a movement of said driving element of more than nine steps.

31. In a combined typewriting and computing machine, the combination with ten numeral keys and indexing devices therefor, of a computing wheel adapted to compute to a base larger than ten, an indexing device for said wheel comprising nine settable pins, a second indexing device for causing said first indexing device to be driven one extra space, a fixed lug on said first indexing device for causing it to be so driven, and a pin comprising a lug settable on said first indexing device for causing it to be driven two extra spaces by said second indexing device.

32. In a combined typewriting and computing machine, the combination with ten numeral keys and indexing devices therefor, of a computing wheel adapted to compute to a base larger than ten, an indexing device for said wheel comprising nine settable pins, a second indexing device for causing said first indexing device to be driven one extra space, a fixed lug on said first indexing device for causing it to be so driven, and a pin comprising a lug settable on said first indexing device for causing it to be driven two extra spaces by said second indexing device, said second indexing device comprising a lever for selectively serving as a driving member therefor, and a second lever cooperating with the setting device for operating said first lever.

33. A computing machine comprising, in combination, a non-decimal number wheel bearing a "0" and the numbers "1" to "11", inclusive, of actuating mechanism therefor, including a driving element, settable indexing devices determinative of movements of said driving element of from one to nine steps, a set of ten number keys representing "0" and the numbers "1" to "9", inclusive, denomination-selecting means, means controlled by said keys and selectively rendered effective by said denomination-selecting means for setting said indexing devices, and an interponent settable by the part of said index-setting means controlled by the "1" key when rendered effective by a part of said denomination-selecting means, one of said indexing devices being provided with means capable of being brought into engaging relation with said interponent by the operation of the same part of said index-setting means but subject to selective action by a different part of said denomination-selecting means, said interponent and indexing device, when both are set, being determinative of a movement of said driving element of eleven steps.

34. In a computing machine comprising denomination-selecting means, settable indexing devices, key-controlled devices for setting said indexing devices, and means for readjusting parts of said devices, so as to set said machine for subtraction by complemental addition, in combination, a device for restoring set indexing devices, a key, a connection through which said key may operate said restoring device when said machine is set for subtraction, a second key normally ineffective to operate said restoring device, and a normally ineffective mechanism capable of being rendered effective by a part of said denomination-selecting means when actuated, and capable, when thus rendered effective, and when said machine is set for subtraction, of being so operated by said first-mentioned key and key-connection, through the intermediary of said restoring device, as to establish a controlling relation between said second-mentioned key and said restoring device.

35. The combination with a series of rack-bars and settable pins on each rack-bar ranging from "1" to "9", of a rack-bar having eleven pins, nine of which are settable for addition, and all of which are settable for subtraction, a set of keys ranging from "0" to "9", a pin-setting linkage for each key from "1" to "9" effective for addition, an additional pin-setting linkage for the "0" key normally inoperable thereby, an additional linkage for the "9" key normally inoperable thereby, and subtraction-setting means adapted to alter the connections of the keys "1" to "9", and to connect the "0" key and the "9" key to said additional linkages to enable the key operation to set the pins for subtraction.

36. The combination with computing wheels, a series of rack-bars and settable pins on each rack-bar ranging from "1" to "9" for driving their computing wheels to the base ten, of a special rack-bar comprising pins for driving its computing wheel to a larger base, a secondary rack-bar associated with said special rack-bar, a lug on said secondary rack-bar, and a pin settable on said special rack-bar adapted to be struck by said lug to drive the special rack-bar more than nine units.

37. In a computing machine comprising denomination-selecting means, settable indexing devices, key-controlled devices for setting said indexing devices, and means for readjusting parts of said devices so as to set said machine for subtraction by complemental addition, in combination, a device for restoring set indexing devices, a key, a key-connection through which said key may operate said restoring device when said machine is set for subtraction, a connection, normally effective at such time, between said key and a selected element of said index-setting devices, a second key, and a normally ineffective mechanism capable of being rendered effective by a part of said denomination-selecting means, when actuated, and capable when thus rendered effective, and when said machine is set for subtraction, of being so operated by said first-mentioned key and said first-mentioned key-connection, through the intermediary of said restoring device, as to disable the normally effective connection from said first-mentioned key to the selected element of said indexing devices, and at the same time establish an operative connection from said second-mentioned key to said restoring device.

38. The combination with a typewriter numeral key "one", of a linkage normally operated thereby for subtraction, a second linkage always operated thereby in subtraction, and means for making said first linkage inoperable by said key by operation of said second linkage.

39. The combination with a typewriter numeral key "one", of a linkage normally operated thereby for subtraction, a second linkage always operated thereby in subtraction, means for making said first linkage inoperable by said key by operation of said second linkage, and a typewriter carriage controlling said means.

40. In a computing machine, the combination with ten numeral keys ranging from

"0" to "9" adapted to normally compute in decimal units, of computing wheels under the control of said keys adapted to compute in both decimal and non-decimal units, the non-decimal units having a base greater than ten, a general operator for driving said wheels simultaneously to effect either addition or complementary subtraction, settable index members for determining how far said wheels shall turn, a set of index-setting members operable by said keys and universal to said settable members, devices settable to cause complementary subtraction by said members, and an interponent settable by said subtraction devices, driven by said operator to make said operator selectively turn certain of said wheels an amount determined by their settable members, and said non-decimal wheel a greater amount than that represented by said settable device.

41. In a computing machine, the combination with a single set of ten numeral keys, of a denomination selector, a set of computing wheels selected by said selector, a settable indexing device for each wheel, a single set of setting devices for said indexing devices operated by said keys, a subtraction-setting member, and means whereby after operation of said subtraction setting member said denomination selector may cause the key operated to disconnect itself from the setting device.

42. In a machine for computing values expressed in units of a non-decimal system and comprising decimal number wheels, each bearing a "0" and the numbers "1" to "9", inclusive, actuating mechanism, including a driving element, for each of said wheels, settable indexing devices for each driving element for determining its extent of movement at each computing operation, a set of ten number keys representing "0" and the numbers "1" to "9", inclusive, means controlled by said keys for setting said indexing devices, and a general operator for moving said driving elements in accordance with the settings of said indexing devices, the combination, with a non-decimal number wheel bearing a "0" and numbered from "1" to "11", inclusive, of actuating mechanism, including a driving element, for said non-decimal wheel, indexing devices settable by said key-controlled setting means to determine movements of the driving element of said non-decimal wheel from one to nine steps, and an interponent, settable by a part of said index-setting means controlled by the "1" key, through which driving relation may be established from said general operator to the driving element of said non-decimal wheel and determinative of a movement of ten steps.

43. In a machine for computing values expressed in units of a non-decimal system and comprising decimal number wheels, each bearing a "0" and the numbers "1" to "9", inclusive, actuating mechanism, including a driving element, for each of said wheels, settable indexing devices for each driving element for determining its extent of movement at each computing operation, a set of ten number keys representing "0" and the numbers "1" to "9", inclusive, means controlled by said keys for setting said indexing devices, and a general operator for moving said driving elements in accordance with the settings of said indexing devices, the combination, with a non-decimal number wheel bearing a "0" and numbered from "1" to "11", inclusive, of actuating mechanism, including a driving element, for said non-decimal wheel, indexing devices settable by said key-controlled setting means to determine movements of the driving element of said non-decimal wheel from one to nine steps, an interponent, settable by a part of said index-setting means controlled by the "1" key, through which driving relation may be established from said general operator to the driving element of said non-decimal wheel and determinative of a movement of ten steps, and a second interponent carried by the driving element of said non-decimal wheel and settable by the part of said index-setting means controlled by said "1" key to coöperate with the first-mentioned interponent, when set, so as to be determinative of a movement of eleven steps.

44. In a computing machine, the combination with two indexing devices, of ten numeral keys, index-setting devices, one associated with each of said keys, two members carrying said indexing devices, one of said members adapted to compute directly and the other of said members adapted to compute indirectly for addition, and a separate member for indirect computing substractively.

45. In a computing machine, the combination with ten numeral keys and a traveling carriage, of computing wheels on which said keys are adapted to compute numbers both decimally and non-decimally, pin bars comprising pins operated by said keys for controlling said wheels, and means whereby one of said keys is always connected to operate said pins, and another of said keys is selectively connected thereto at certain points in the travel of said carriage.

46. In a computing machine, the combination with ten numeral keys and a traveling carriage, of computing wheels on which said keys are adapted to compute numbers both decimally and non-decimally, indexing devices operated by said keys for controlling said wheels, means whereby one of said keys is always connected to said indexing devices, and subtraction means whereby another of said keys is selectively connected thereto at certain points in the travel of said carriage.

47. In a computing machine, the combination with ten numeral keys and a traveling carriage, of computing wheels on which said keys are adapted to compute numbers both decimally and non-decimally, pin bars comprising pins operated by said keys for controlling said wheels, means whereby one of said keys is always connected to operate said pins, and subtraction means whereby another of said keys is selectively connected thereto at certain points in the travel of said carriage.

48. In a computing machine, the combination with ten numeral keys and a traveling carriage, of computing wheels on which said keys are adapted to compute numbers both decimally and non-decimally, linkages operated by said keys, settable pins operated by said linkages for controlling said wheels, means whereby one of said keys is always connected to its linkage to operate said pins, means whereby another of said keys is adapted to be selectively connected to its linkage at certain points in the travel of said carriage, and a connection operated by another of said keys adapted to make said last-named means effective.

49. In a computing machine, the combination with ten numeral keys and a traveling carriage, of computing wheels on which said keys are adapted to compute numbers both decimally and non-decimally, indexing devices operated by said keys for controlling said wheels, means whereby one of said keys is always connected to said indexing devices, means whereby another of said keys is selectively connected thereto at certain points in the travel of said carriage, and a connection operated by another of said keys adapted to make said last-named means effective.

50. The combination with computing wheels, a series of rack-bars, and settable pins on each rack-bar ranging from "1" to "9" for driving their computing wheels to the base ten, of a special rack-bar comprising settable pins for driving its computing wheel to a larger base, a general operator for driving said rack-bars, a supplementary bar having a lug adapted to engage a set pin on said special rack-bar to drive it for addition, and a second supplementary bar having a lug adapted to engage another set pin on said special rack-bar to drive it for subtraction.

51. In a combined typewriting and computing machine, the combination with a single set of typewriter numeral keys and a case-shift mechanism, of computation bars having settable pins, means for operating said case-shift mechanism to automatically make said keys ineffective for computation on said bars. and other means for operating said case-shift mechanism for causing said keys to remain effective to compute.

52. In a combined typewriting and computing machine, the combination with typewriter numeral keys, computing wheels, and connections between said keys and said wheels, of a case-shift mechanism, and two devices for operating said case-shift mechanism, one only of said devices including a rock-shaft adapted to disconnect the keys from the wheels when the case is shifted.

53. In a computing machine adapted to compute to the base two and also to the base ten, the combination with pin bars having pins adapted to be set for complementary subtraction, of a universal member for so setting certain of said pins, a universal member for restoring the set pins, and two levers through which said universal members may set and restore a pin of the indexing device which computes to the base two.

54. In a machine for computing values expressed in units of a non-decimal system and comprising decimal numeral wheels, each bearing a "0" and the numbers "1" to "9," inclusive, actuating mechanism, including a driving element, for each of said wheels, settable indexing devices for each driving element for determining its extent of movement at each computing operation, a set of number keys representing "0" and the numbers "1" to "9," inclusive, means controlled by said keys for setting said indexing devices, a general operator for moving said driving elements in accordance with the settings of said indexing devices, and a subtraction-setting device, comprising means for setting certain of said indexing devices, and for changing the relation of parts of said index-setting means, so as to effect settings for substraction by complemental addition, the combination, with a non-decimal number wheel, bearing a "0." the numbers "1" to "9," inclusive, and additional numbers running above "9," of actuating mechanism, including a driving element, for said non-decimal wheel. indexing devices, settable by said key-controlled setting means, to determine movements of the driving element of said non-decimal wheel, of from one to nine steps, when said machine is set for addition. additional indexing devices being provided for the driving element of said non-decimal wheel, to be used when said machine is set for subtraction, and an interponent. settable by said subtraction-setting device, when operated to set said machine for subtraction. so as to co-operate with any set indexing device of the driving element of said non-decimal wheel, and thus determine a number-wheel movement of greater extent than that normally determined by that indexing device alone.

55. In a computing machine, the combination with ten numeral keys ranging from "0" to "9," of pin-setting members operable thereby, pins settable by said members to compute to the base ten and to another base, means for setting the "9" pins in base ten and the corresponding pins in other bases to effect subtraction, and a "9" pin-restoring linkage operable by all said keys including the "0" key to enable the registration of numbers subtractively on said pins.

56. A machine for computing numbers of a system involving decimal units and non-decimal units having a base greater than ten, said machine comprising, in combination, a set of ten numeral keys representing "0" and the numbers "1" to "9," respectively, a totalizer including a section for computing in decimal units and a section for computing in non-decimal units having a base greater than ten, actuating mechanism for said totalizer, said actuating mechanism comprising a common driving means and variably-settable indexing devices for controlling the operation of said totalizer at each actuation of said driving means, index-setting mechanism normally affording connections between said keys and said indexing devices such that, on depressing one or more of said keys in accordance with the elements of any number as indicated in the notation of said system, a setting of said indexing devices determinative of an addition of said number by said totalizer will be effected, and a subtraction-setting device including means for so varying the relations between said indexing devices and said key-controlled index-setting mechanism, and between said driving means and said indexing devices, that a depression of one or more of said keys in accordance with the element of any number, as indicated in the notation of said system, may effect a setting of said actuating mechanism determinative of a subtraction of said number by said totalizer.

57. In a combined typewriting and computing machine, the combination with ten numeral keys and universal pin-setting bars operated thereby, of a computing wheel adapted to compute to a base larger than ten, a pin bar for said wheel comprising nine settable pins, an indexing device for causing said pin bar to be driven an extra distance, a fixed lug on said pin bar for causing it to be so driven, and a pin comprising an extra lug settable on said pin bar for causing it to be driven two extra spaces by said indexing device, said indexing device comprising a lever for selectively serving as a driving member therefor, and a second lever coöperating with the pin-setting bar for operating said first lever.

58. The combination with a shiftable platen, of two keys for shifting it, a shift frame, a rock-shaft forming part of said frame, a rock arm fast on said shaft, an extension on one of said keys for operating said shaft by its rock arm, a sleeve rotatable on said shaft, a rock arm fast on said sleeve, an extension on the other key operating said sleeve through its rock arm, an abutment on said shaft to enable said sleeve to operate it, a traveling carriage including said platen, a denomination selector traveling with said platen, and means connected to said sleeve for making said selector ineffective when said sleeve is actuated.

59. The combination with a shiftable platen, of two keys for shifting it, a shift frame, a rock-shaft forming part of said frame, a rock arm fast on said shaft, an extension on one of said keys for operating said shaft by its rock arm, a sleeve rotatable on said shaft, a rock arm fast on said sleeve, an extension on the other key operating said sleeve through its rock arm, an abutment on said shaft to enable said sleeve to operate it, a traveling carriage including said platen, a normally inoperative denomination selector traveling with said carriage and pivoted thereon, a roll adapted to raise said selector to operative position, and means moved by said sleeve for making said selector inoperative.

60. The combination with a shiftable platen, of two keys for shifting it, a shift frame, a rock-shaft forming part of said frame, a rock-arm fast on said shaft, an extension on one of said keys for operating said shaft by its rock arm, a sleeve rotatable on said shaft, a rock arm fast on said sleeve, an extension on the other key operating said sleeve through its rock arm, an abutment on said shaft to enable said sleeve to operate it, a traveling carriage including said platen, a denomination selector traveling with said platen, a roll adapted to make said selector operative, a rock-shaft on which said roll is mounted, and an extension on said sleeve adapted to rotate said rock-shaft to carry said roll to inoperative position.

61. In a combined typewriting and computing machine, the combination with computing wheels, a series of rack-bars, settable pins on each rack-bar for driving its computing wheel, a general operator for driving said rack-bars, a subtraction-setting device, and a set of typewriter numeral keys, of a movable bar tending to move with said operator to drive one of the rack-bars by its set pin, and a device on said movable bar adapted to be set by the operation of said subtraction-setting device for causing said bar to be variably positioned relatively to said operator to drive its coöperative rack-bar variably by the same set pin.

62. The combination with a set of pin bars and settable pins thereon, of a general operator for driving said bars by said pins and a notch in said operator for varying the driving of a certain bar, a second notch on said bar and an interponent adapted to selectively occupy said second notch.

63. In a computing machine the combination with a pin bar and a settable pin thereon, of a lever connected to said pin, a second lever for operating said first lever, and two linkages for operating said second lever, one to set said pin and the other to unset said pin.

64. In a combined typewriting and computing machine, the combination with a pin-setting linkage, of a second pin-setting linkage and a parallel motion device on the first linkage for selectively determining whether the second linkage shall be operative.

65. In a combined typewriting and computing machine, the combination with numeral keys and a traveling carriage, of a units computation member adapted to be controlled by said keys, a tens computation member, adapted to be controlled by said keys, connections whereby said carriage selects said members one after another, and means whereby one of said keys is selectively made ineffective to compute on said units member by its action in computing tens.

WILLIAM L. GUMPRECHT.

Witnesses:
J. J. BASHERVILLE,
GEO. H. VARNEY.